(12) United States Patent
Walker et al.

(10) Patent No.: US 8,136,133 B2
(45) Date of Patent: Mar. 13, 2012

(54) METHODS AND SYSTEMS FOR BROADCASTING MODIFIED LIVE MEDIA

(75) Inventors: Jay S. Walker, Ridgefield, CT (US); Evan Walker, Ridgefield, CT (US); Russell P. Sammon, San Francisco, CA (US); Zachary T. Smith, Norwalk, CT (US); Jeffrey Y. Hayashida, San Francisco, CA (US); Renny S. Tallanchich, London (GB); Robert C. Tedesco, Fairfield, CT (US)

(73) Assignee: Walker Digital, LLC, Stamford, CT (US)

( * ) Notice: Subject to any disclaimer, the term of this patent is extended or adjusted under 35 U.S.C. 154(b) by 787 days.

(21) Appl. No.: 12/270,455

(22) Filed: Nov. 13, 2008

(65) Prior Publication Data
US 2009/0144785 A1     Jun. 4, 2009

Related U.S. Application Data

(60) Provisional application No. 60/987,456, filed on Nov. 13, 2007.

(51) Int. Cl.
| H04N 7/10  | (2006.01) |
| H04N 7/16  | (2006.01) |
| H04N 7/025 | (2006.01) |
| H04N 7/173 | (2006.01) |
| H04N 5/14  | (2006.01) |
| H04N 5/38  | (2006.01) |
| H04N 5/222 | (2006.01) |
| H04N 9/64  | (2006.01) |
| H04N 9/74  | (2006.01) |

(52) U.S. Cl. .......... 725/32; 725/114; 725/144; 348/575; 348/576; 348/578; 348/722; 348/723

(58) Field of Classification Search ............. 725/32, 725/114, 144; 348/575, 576, 578, 722, 723
See application file for complete search history.

(56) References Cited

U.S. PATENT DOCUMENTS

| 5,264,933 A  * | 11/1993 | Rosser et al. ............. 348/578 |
| 5,553,864 A    | 9/1996  | Sitrick                            |
| 6,081,273 A    | 6/2000  | Weng et al.                        |
| 6,350,238 B1   | 2/2002  | Olstad et al.                      |
| 6,425,825 B1   | 7/2002  | Sitrick                            |
| 6,567,038 B1   | 5/2003  | Granot et al.                      |
| 6,990,681 B2   | 1/2006  | Wang et al.                        |

(Continued)

OTHER PUBLICATIONS

Bullet Time, From Wikipedia, download date Aug. 29, 2007, 10 pp.

(Continued)

*Primary Examiner* — Dominic D Saltarelli
(74) *Attorney, Agent, or Firm* — Fincham Downs, LLC; Carson C. K. Fincham

(57) ABSTRACT

Methods and systems are presented for broadcasting a modified live media feed of an event. In an embodiment, the method includes receiving a live media feed at a broadcast computer from one or more recording devices, wherein the live media feed includes real time occurrences of a live event. The live media feed is broadcast after a predetermined delay, and the method includes identifying, during monitoring of the live event, a portion of the live event that is suitable for application of a modification effect. The process also includes the broadcast computer applying the modification effect to a portion of the live media feed corresponding to the identified portion of the live event, and then broadcasting the modified live media feed.

23 Claims, 10 Drawing Sheets

U.S. PATENT DOCUMENTS

| | | |
|---|---|---|
| 7,020,892 B2 | 3/2006 | Levesque et al. |
| 7,079,176 B1 | 7/2006 | Freeman et al. |
| 2002/0190991 A1 | 12/2002 | Efran et al. |
| 2003/0028873 A1* | 2/2003 | Lemmons ................ 725/36 |
| 2008/0032797 A1 | 2/2008 | Harris et al. |

OTHER PUBLICATIONS

Eaton-Robb, Pat, "Sports video games go real-time", Denver Post, May 28, 2007, 2 pp.

Amazon.co.uk: BloodRayne (Xbox), download date Sep. 17, 2007, 5 pp.

Tony Hawk's Project 8 Player Reviews, http: www. Gamefaqs. Com / console / xbox 360/ review/ download date Sep. 17, 2007, 3 pp.

Fox, David, "LookSmart Football's Coming home—to your PC", http: find articles. Com/p/articles/mi-qn4158is, download date Oct. 10, 2007, 1 pg.

Darim Vision Broadcasting, http: www. darim. tv /menu.do?key=31, download date Sep. 17, 2007, 1 pg.

Halfbakery: Seeing in slow motion, www. halfbakery. com/idea/ seeing 20in 20slow 20 motion, Apr. 6, 2001, 4 pp.

Gametrailers.com, bl4ckwidow—blogs, download date Sep. 17, 2007, 3 pp.

* cited by examiner

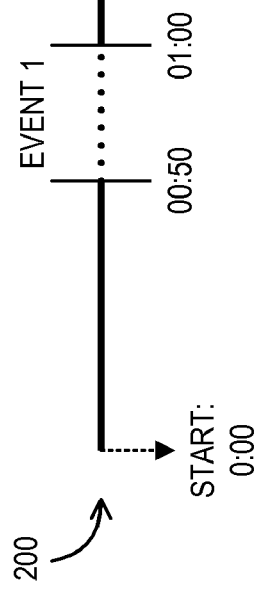
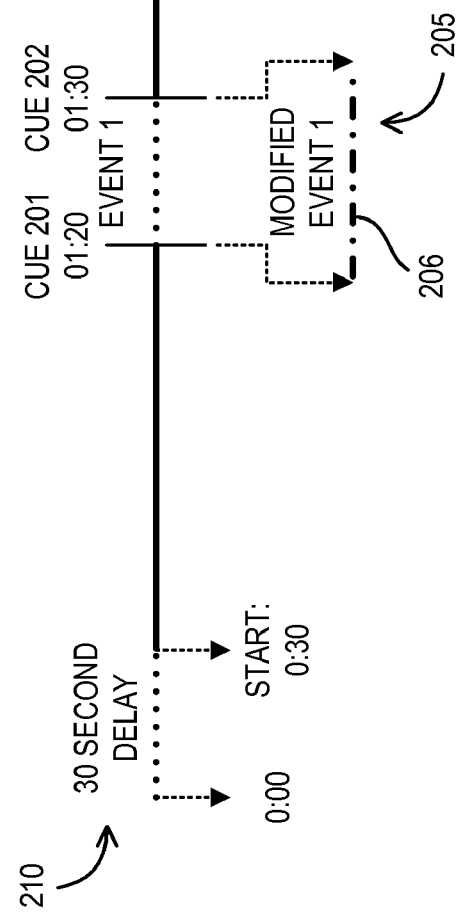

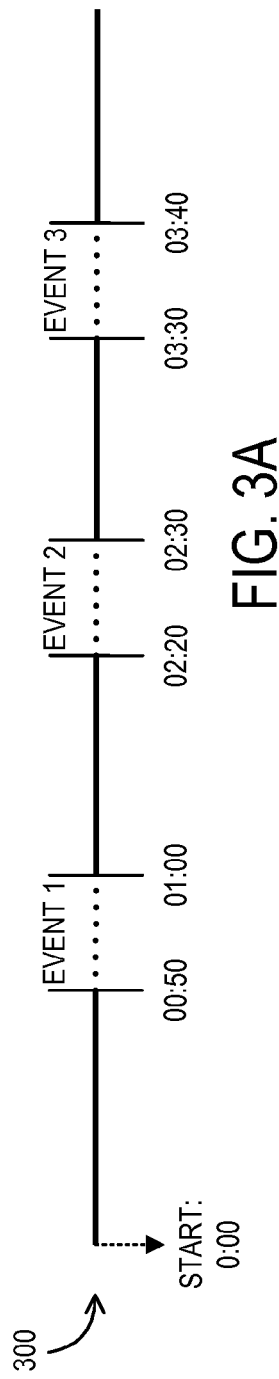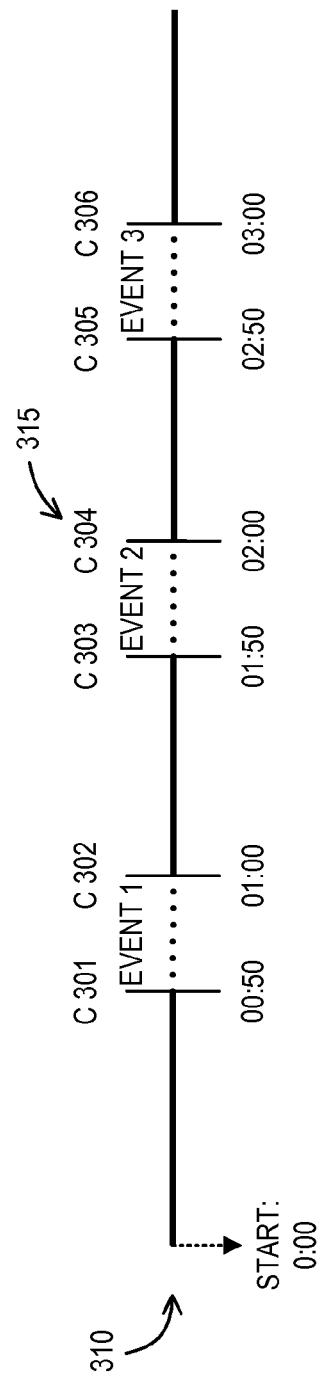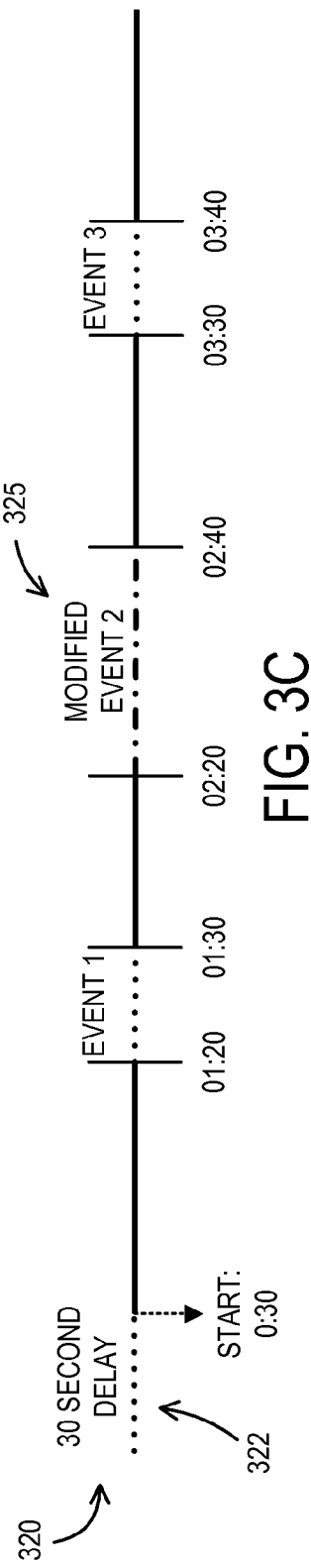

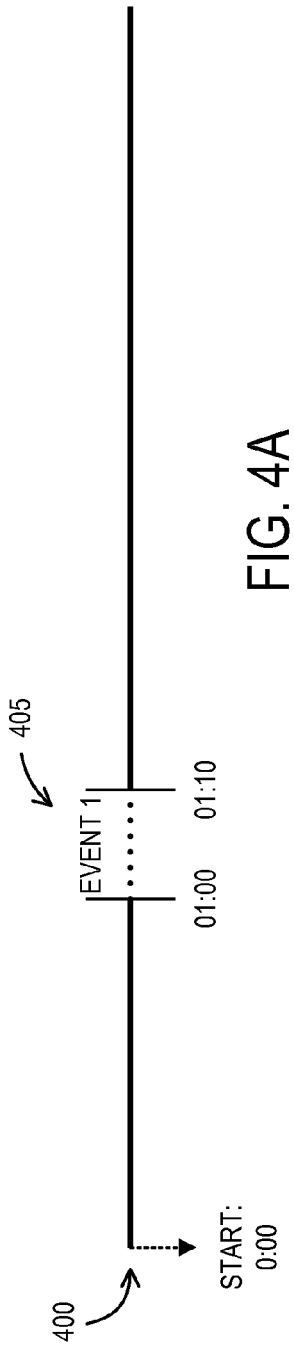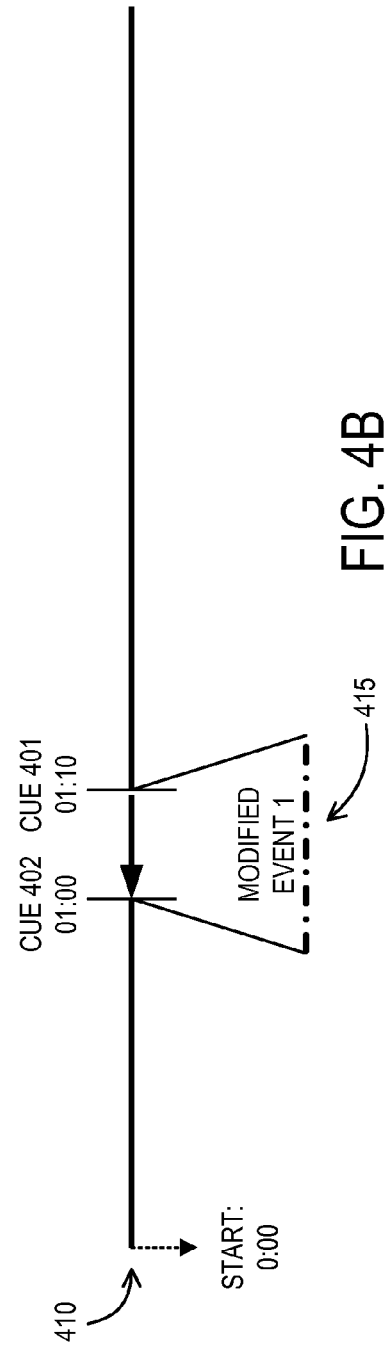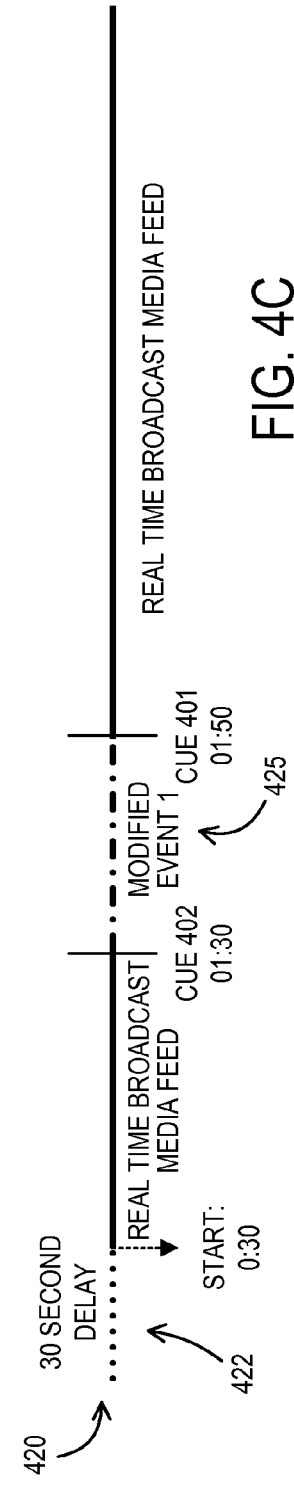

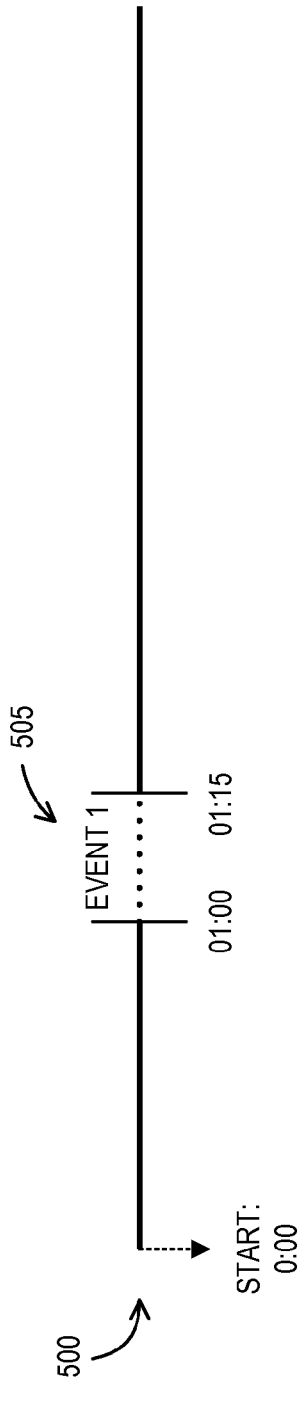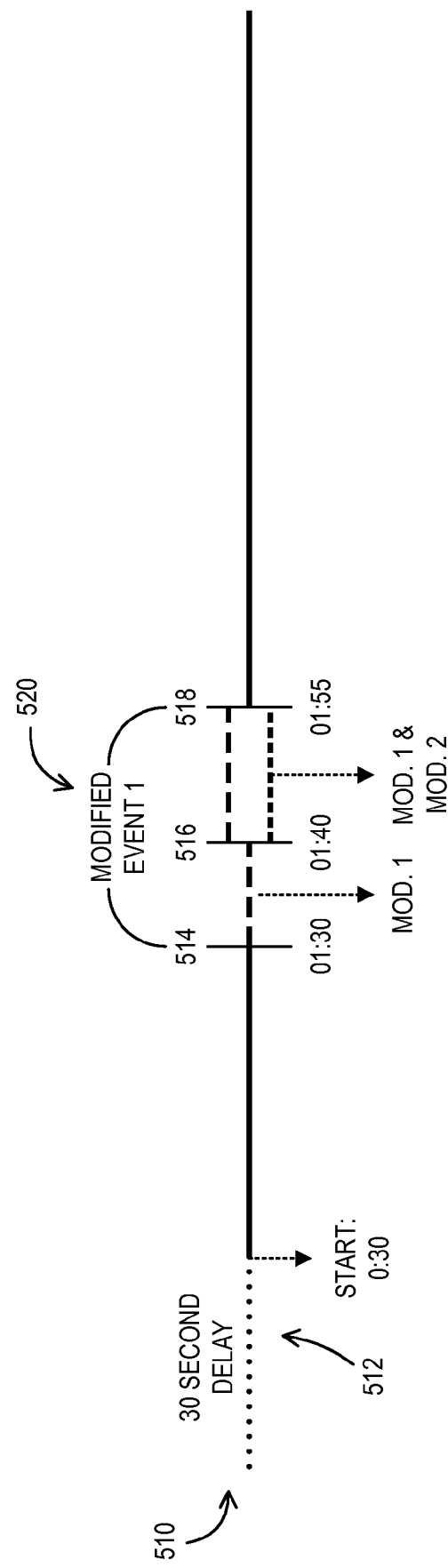

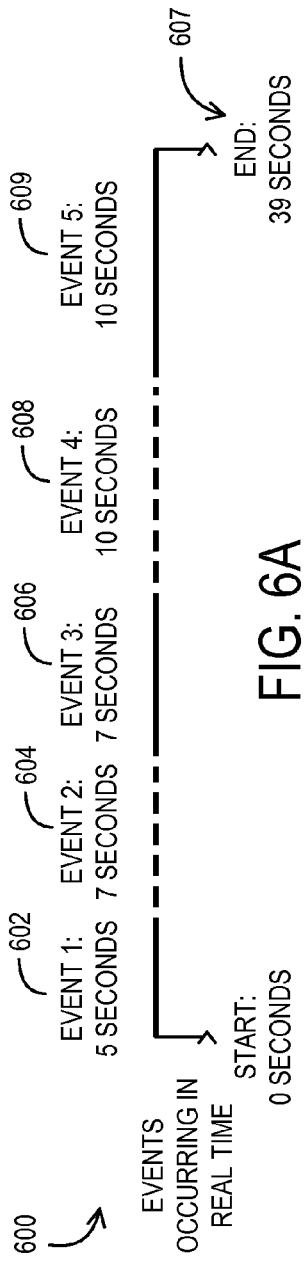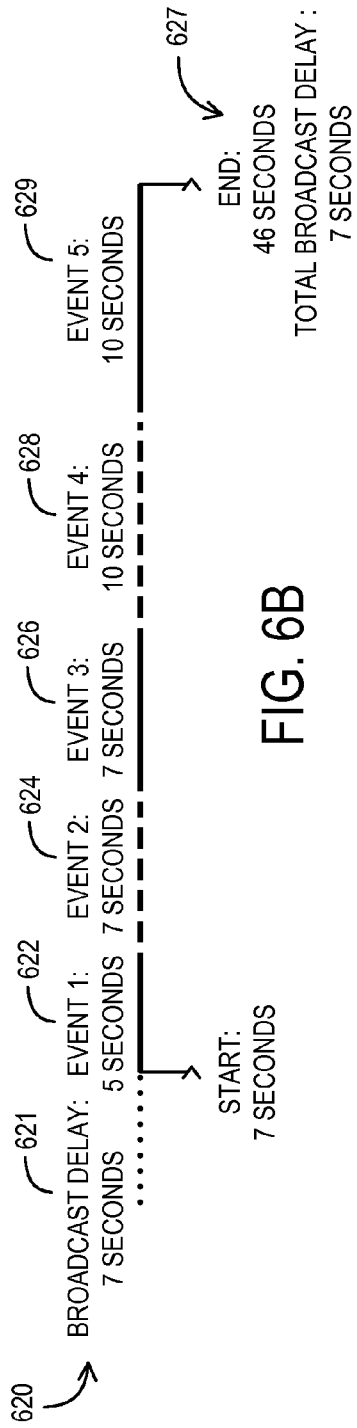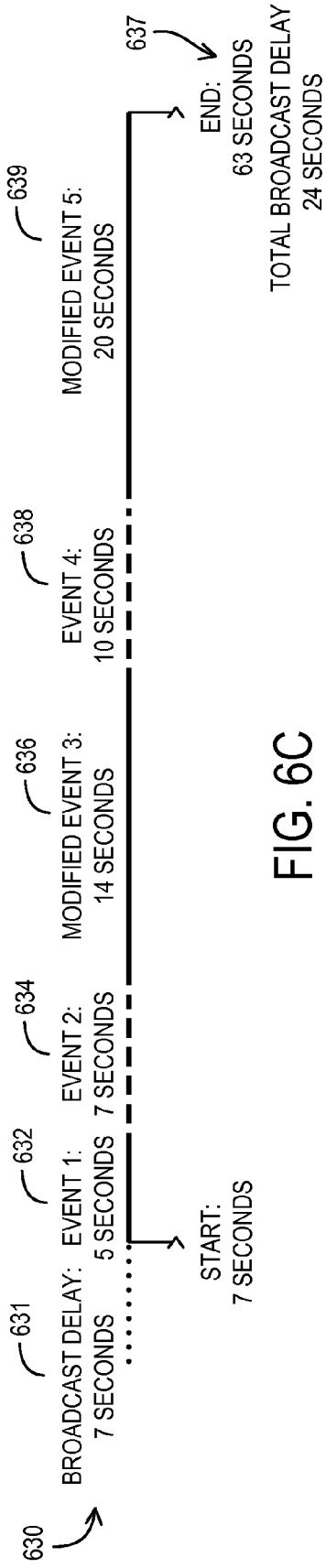
FIG. 6A
FIG. 6B
FIG. 6C

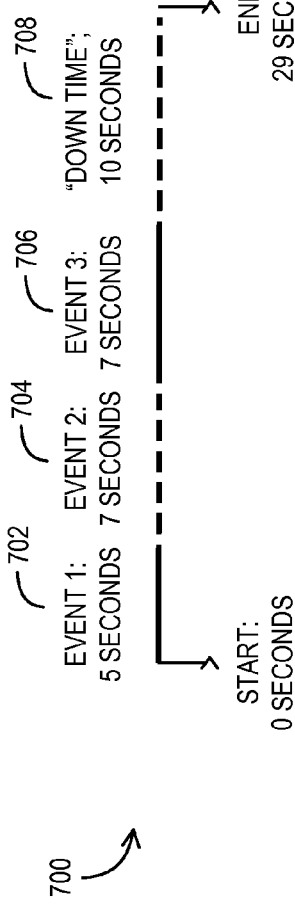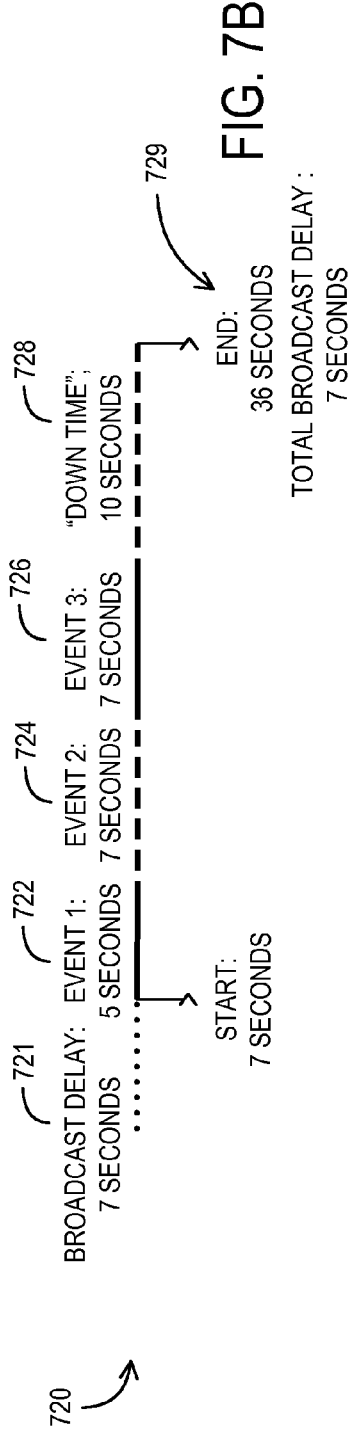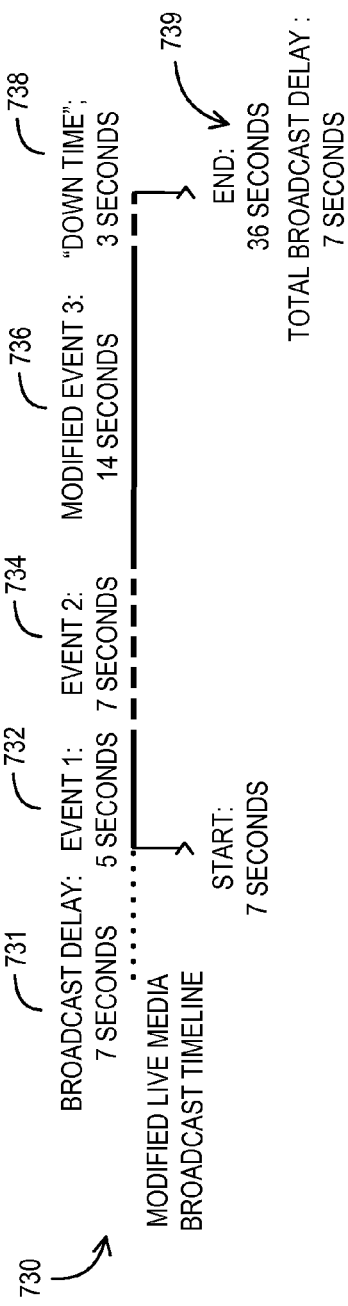

METHODS AND SYSTEMS FOR BROADCASTING MODIFIED LIVE MEDIA

CROSS-REFERENCE TO RELATED APPLICATION

This application claims the benefit of U.S. Provisional Patent Application No. 60/987,456 filed Nov. 13, 2007 entitled SYSTEMS AND METHODS FOR PRESENTING A MODIFIED BROADCAST, which is hereby incorporated by reference herein.

FIELD OF THE INVENTION

The present invention generally relates to methods, systems and apparatus for broadcasting modified live media of a live event to viewers.

BRIEF DESCRIPTION OF THE DRAWINGS

FIGS. 2A and 2B show timelines that illustrate an editing process according to an embodiment;

FIGS. 3A, 3B and 3C depict timelines illustrating another editing process according to an embodiment;

FIGS. 4A, 4B and 4B show yet other timelines illustrating an editing process according to another embodiment;

FIGS. 5A and 5B show timelines illustrating an editing process for modifying a media feed of a live event for broadcast to viewers according to an embodiment;

FIGS. 6A, 6B and 6C depict timelines illustrating how a broadcast delay introduced into the media feed of the live event, plus delays introduced by modifications to particular events of the live media feed, may extend the modified live media broadcast to result in a longer broadcast delay;

FIGS. 7A, 7B and 7C show timelines illustrating a process for compensating for the additional delays that are introduced into a live media feed by the modifications that are made to selected events occurring during the live media feed, so that the total broadcast delay of the live event is corrected such that the total delay equals the initial broadcast delay.

DETAILED DESCRIPTION OF THE INVENTION

Figure 1A:
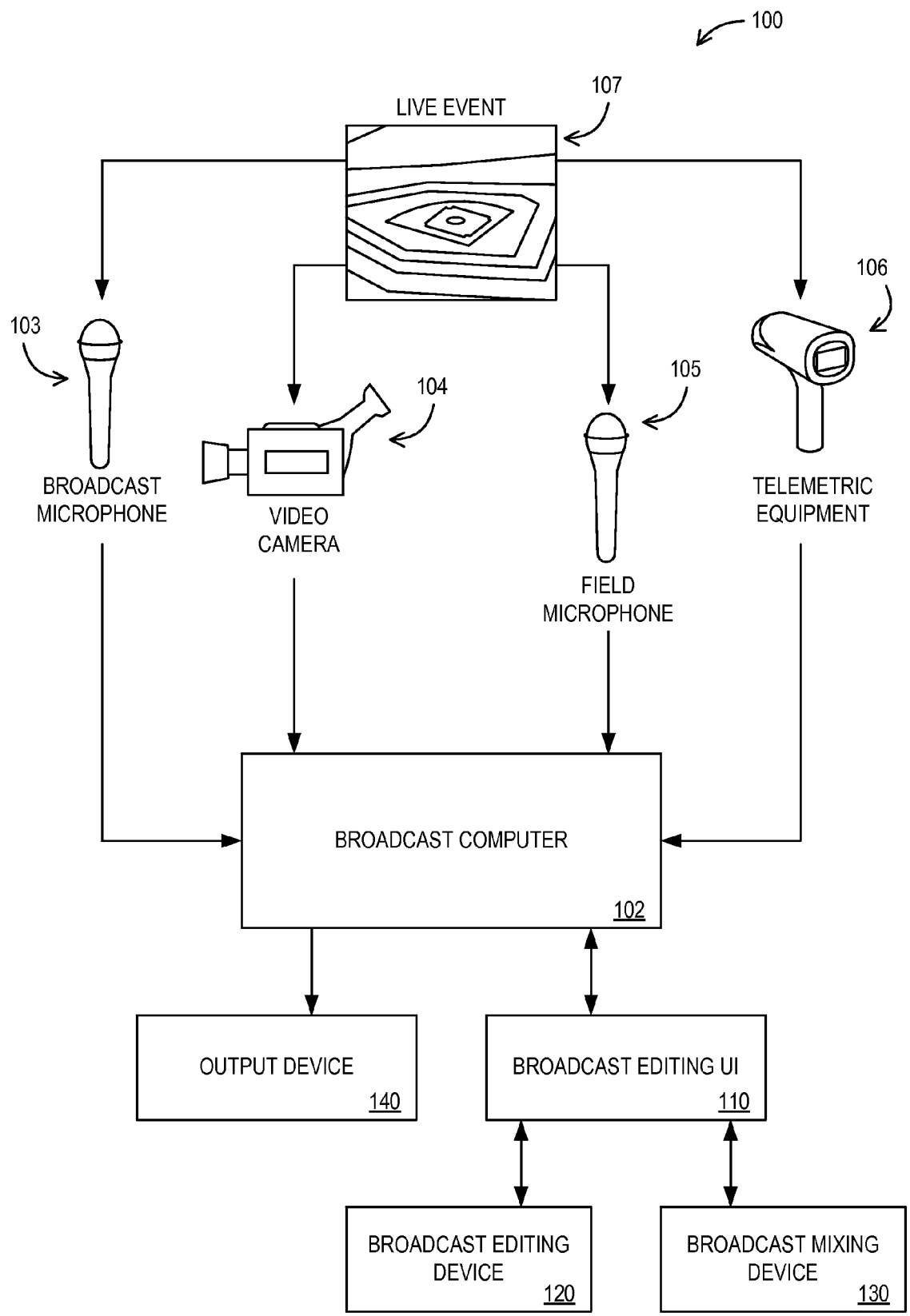
FIG. 1A illustrates a system configured to implement a process for generating a modified live media broadcast for a viewer according to an embodiment of the invention.

Advantages and features of the invention will become apparent upon reading the contents of this document, and the nature of the various aspects of the invention may be more clearly understood by reference to the following detailed description of exemplary embodiments of the invention, the appended claims and to the drawings.

When a sporting event is broadcast and televised in real time, many of the most important plays come and go in short moments of suspense and excitement. For example, during the broadcast of a baseball game there are numerous plays that occur, and a single play occurring late in the game may be of particular interest. In a specific example, during the seventh inning of a baseball game the score is tied and the batter hits a line drive to center field as a base runner takes off from second base, rounds third base and heads for home. At the same time, the center fielder scoops up the ball and throws it to the catcher, resulting in a close play at the plate. The entire play occurs in less than 10 seconds; however those ten seconds may decide whether a team wins or loses a game that takes three or more hours to play. Further, not only does the entire play occur relatively quickly when compared to the rest of the game, but the portion of the play occurring at home plate as the catcher catches the ball and puts a tag on the runner sliding towards home, which is the most important part of the play, occurs in the span of about one second.

Now, consider the experience of a viewer watching the live broadcast of the same baseball game. He or she may watch the entire game waiting for this single event to occur that decides whether a favorite team wins or loses. Anticipation and suspense builds after the hit, a mix of fear and excitement grows as the play progresses, and then all of a sudden the play is over. Broadcasters typically provide slow motion replays in an attempt to extend and improve the viewer's experience of the play; however this feature is used only after the viewer has already seen the outcome. The viewer has experienced an emotional climax during the initial viewing when the result was still unknown, and thus the replays lack much of the thrill obtained when the viewer sees the play for the first time.

In order to improve current broadcasts by prolonging suspenseful and exciting moments of a live event, the present methods and systems enable live media to be televised in an altered state, such as in slow motion, while the play is initially broadcast. For instance, a broadcast editor may add a delay between the live event and the actual broadcasting of the event, which delay allows an editor time to identify and modify exciting athletic plays to be televised in slow motion. Thus, the ten second baseball game play described above can be transformed into an exciting and theatrical 40 seconds of entertainment. Similarly, that sports play's split second culmination becomes five seconds of tantalizing suspense. Now, rather than absorbing a sports play's segmented brilliance over the course of multiple replays, viewers can be shown spectacular sports plays, for the first time, with special effects such as slow motion already applied. In some embodiments, the broadcast editor may be a human editor who is watching the event and/or a live media feed and who is capable of identifying portions of the live event (such as specific sub-events that may occur) for modification. Some implementations may utilize a device as the broadcast editor, which device may be in addition to, or exclusive of, a human editor. For example, the broadcast editor may be a computer configured to automatically monitor the live event, identify portions of the live event for modification, and provide instructions to an output device for modifying one or more corresponding portions of a live media feed.

In some embodiments, a live media feed may be modified in a variety of ways other than by slowing down the media output. In some embodiments, live media feed modification may offer a variety of different camera angles for a particular sports play, and/or in some instances a plurality of camera angles may be broadcast at the same time. Additionally, camera angles may not necessarily be obtained only from conventional cameras, for example, in some cases a computer generated 3D simulation of a sports play may be created. For example, data obtained from cameras and sensors at a live event is transmitted to a computer that processes the data and renders three-dimensional simulated views of the event. In some embodiments, computer generated visual effects may be added to actual video footage in order to enhance the viewer's experience (for example, the contrast or lighting may be altered, computer generated overlays may be added, the video may be entirely computer simulated in order to provide innovative camera angles, and the like).

In an implementation, a process includes recording a live media feed of an event, broadcasting the live media feed after introducing a predetermined delay and identifying, during the broadcast delay, a portion of the live media feed that is suitable for application of at least one modification. The identified portion of the live media feed is then modified and broadcast. In some embodiments, the process includes reducing or eliminating an elongated delay that was caused by the modification of the live media feed. The elongated delay may be reduced or eliminated by omitting down time in the live media feed, or by broadcasting replays at a normal playback speed instead of in slow motion, which is explained below.

It should be noted that although some embodiments focus primarily on sports-related implementations of broadcast events, the present systems, methods and apparatus are not so limited and may be applied to non-sporting event broadcasts of real time non-sporting events as well. For example, a news broadcast may wish to slow down live coverage of a scheduled news event, such as a segment concerning the building implosion of the Stardust Casino and Hotel in Las Vegas, Nev., which is set to occur at a predetermined time. In another example, a televised talk show (for example, The Late Show with David Letterman™) may wish to enhance the live broadcast of a special segment. In general, the present systems, methods and apparatus may be used to enhance the viewing of a deed, action, exploit, play, action sequence, competition, contest, match, meet, tournament, athletic game, non-athletic game, or any other type of event or action that is of interest to viewers.

The following terms are utilized in the present disclosure:

Broadcast (Media)—Refers to the presentation of a live media feed of an event to a plurality of consumers and/or viewers who may or may not be physically present at the event's occurrence. For example, content transmitted from a television network to a cable provider, and subsequently to cable subscribers, is considered "broadcast media". However, any live event or recorded event that is transmitted over a network to those connected to the network can be considered a broadcast. Thus, a broadcast can be transmitted and received via radio, satellite, cellular network, other wireless device, cable, the internet, WAN, LAN, intranet, and the like.

Media—Refers to one or more types of "footage" that may be recorded at an event. For example, video footage may be obtained during a live sports event by video recording devices such as a video camera, or a digital video recorder, and the like. Similarly, audio footage may be obtained during a sports event by use of audio recording devices such as a microphone, specialized audio receiving equipment, and the like. In some embodiments, the term media may also include computer generated images and/or sounds that are created for supplementing the media footage recorded by the audio and video equipment. Once the media is obtained and/or generated by such devices, each component (content) may be sent to a broadcast editor for processing and/or combining such that it becomes the broadcast content.

Live Media Feed—Refers to one or more types of media recorded by one or more recording devices at a live event. The live media feed is sent to a broadcast computer for processing, wherein a broadcast editor has the opportunity to modify the live media feed. In some embodiments, the broadcast editor provides instructions for modifying the live media feed, which are processed by the broadcast computer to apply one or more predefined modification types to a portion of the live event during a broadcast delay. In such embodiments, at the end of the broadcast delay, the live media feed is broadcast as a modified live broadcast (thus becoming the "broadcast media").

Edited Media Feed—Refers to a live media feed that has been marked for one or more modifications by a broadcast editor, and/or has been modified by a broadcast editor.

Broadcast Delay—the term "broadcast delay" refers to the amount of time between when a live event occurs and when it is broadcast. Many live events are currently broadcast after a short delay (on the order of a few seconds—live events are rarely broadcast instantaneously) so that any vulgar material that may occur can be censored or deleted from the broadcast. For example, if during a televised presentation of a football game a fan runs onto the playing field holding a sign containing curse words or other defamatory and/or obscene material in front of a television camera, a television operator can use the time delay to prevent the image of the fan and sign from being broadcast by, for example, switching to another camera during the broadcast delay. The present methods, systems and apparatus propose to use such a broadcast delay for the unconventional purpose of modifying live media before it is broadcast.

Modified Event Delay—the term "modified event delay" refers to the additional amount of time added to a portion of a live event that occurs when a modification effect is added to that portion and then is broadcast. For example, if the live media feed of a baseball game includes a portion of a base runner stealing second base that lasts for 5 seconds, and that portion of the live event is modified with a slow-motion effect to result in a first modified live media feed that is broadcast having a 12 second duration, then the modified event delay is 7 seconds (which is equal to twelve seconds minus five seconds). In this example, the modified event delay of 7 seconds extends or adds to a total broadcast delay of the modified live media broadcast, and if multiple portions of the live media footage are modified then the broadcast delay may get longer and longer unless a compensation process is implemented (which will be explained below).

Broadcast Editor—May be a human (person) watching a live event occur in real time who can control and/or modify the media feed of a live event, either directly or by providing instructions for other devices to apply modifications. The broadcast editor identifies content that is suitable for one or more modifications, and makes adjustments to the live media feed (in some embodiments, by modifying an editing version of the live media feed). The broadcast editor has access to both the footage of an event and to editing devices that can be utilized to modify the footage before broadcasting. In some embodiments, a broadcast editor is a computer or similar device (or group of devices) that is programmed to perform editing tasks, for example, a server computer that is programmed to operate in such manner.

Modified Live Media Feed (results in a "modified broadcast")—Refers to audio footage and/or video footage (of the live media feed) that has been altered before being broadcast (as a "modified broadcast"). For example, the broadcast speed of video footage of a particular event may be reduced, to therefore create a slow motion effect, and audio commentary may be added to match the slow motion effect. In another embodiment, computer generated imagery or synthetic images may replace a portion of the recorded footage (for example, of a play occurring during a sports contest), providing the viewer with a wider variety of camera angles of an event. In yet another embodiment, computer generated graphics may be overlaid onto one or more portions of the broadcast footage of an event. Modifications may be combined, and various other modifications are contemplated and are described below.

Computer Generated Imagery/Synthetic Images—In some embodiments, Computer Generated Imagery (CGI) technology is utilized to present: (i) three-dimensional (3D) synthetic images of an event that are not filmed using cameras; (ii) synthetic slow motion video clips; and (iii) synthetic images overlaid onto existing video footage of an event. CGI software may be stored on a broadcast computer controlled by a broadcast editor. Examples of such technology and processes can be found in U.S. Pat. No. 6,990,681, assigned to the Sony Corporation of Japan. In addition, an example of CGI software with three-dimensional (3D) rendering capability may be found in the Electric Image Animation System 3D Rendering and Animation Software for Macintosh and Windows, manufactured by EI Technology, LLC.

1. System Components

Conventional recording devices such as video cameras, digital video cameras, microphones, digital recorders, and the like may be used to transmit live video and audio feeds (a live media feed) to be broadcast. Examples of such recording devices are the Canon GL1 DV Camcorder manufactured by the Canon Incorporated, the SHURE MC50B/MC51B microphone manufactured by Shure Incorporated, or the HDC-1000 portable camera manufactured by Sony Corporation. The recording device may feature a high quality zoom lens such as the DigiSuper 100AF manufactured by Canon Incorporated. Embodiments are described herein that broadcast a slow motion version of a live media feed. Accordingly, slow motion cameras, which capture a larger amount of frames per second than normal cameras, such as the Sony HDC-3300 Slow Motion Camera manufactured by Sony Corporation, may be used so that a desired slow motion effect can be realized.

In some embodiments, it is contemplated that a separate commentary may be inserted to coincide with or synchronize with effects that are applied to the video portion of a live media feed. In such embodiments, additional microphones may be used to capture alternate commentary for a modified video feed (for example, an alternate commentator may provide play-by-play commentary that describes a play of a game as it is being broadcast in slow motion). These video and audio feeds may be synchronized using a conventional broadcast mixer.

In some embodiments, creating and broadcasting synthetic images of live events are also contemplated. In order to create the synthetic images, real time telemetric data may need to be collected and transmitted to a broadcast computer. This data may be combined with a database of static measurements and images for use by a computer to render three dimensional images of the live event. Examples of hardware that may be used to collect and transmit telemetric data include Radio Detection and Ranging devices (RADAR), Laser Range-Finders (LIDAR), Sound Navigation and Ranging devices (SONAR), GPS transmitters (for example, Global Positioning System transmitters), RFID Sensors (for example, Radio Frequency transmitters), cameras, and Motion sensors and/or detectors. Details of such devices are provided immediately below.

Radio Detection and Ranging devices (RADAR) use an emitter to emit radio waves, a portion of which bounce off of objects and return to a detector of the device. The returning waves are detected and utilized to measure range, altitude, direction and speed of moving or fixed objects.

Laser Range-Finders (LIDAR) are similar to RADAR, and LIDAR devices use an emitter to emit a concentrated beam of light, and a portion of the concentrated light bounces off of an object and returns to a light detector associated with the device. A LIDAR device is used to determine range, speed, shape, altitude, direction, and the like of an object.

Sound Navigation and Ranging devices (SONAR) are similar to LIDAR and RADAR, but utilize sound waves to obtain various measurements. In particular, an emitter emits sound waves that bounce off objects and a portion of the sound waves return to a detector of the device. A SONAR device is also used to determine range, speed, shape, altitude (or depth), direction, and the like of an object.

GPS transmitters may be worn by players and other participants (for example, coaches, referees, umpires, and the like in order to identify where the player is on the playing area, such as a field and/or court), and provide position data.

RFID Sensors may be worn by players and other participants (such as coaches, referees, umpires, and the like in order to identify which player(s) are currently on and off of the field and where). An example of such a system is described in U.S. Pat. No. 6,567,038 to Granot et al., which is incorporated herein by reference.

Cameras capturing images may be used to detect measurements and to provide data for use by a computer to build three-dimensional models of objects by calculating triangulation. One example of such a system is described in U.S. Pat. No. 6,081,273 to Weng et al., which is incorporated herein by reference.

Motion sensors and/or detectors such as multiple-axis gyroscopes or accelerometers (for example, one or more accelerometers may be paired with a transmitting device that could be embedded in a player's uniform). Such sensors and/or detectors may transmit telemetry data of one or more body parts during a play, such as the arm or leg of a player. An accelerometer may be particularly useful at measuring sudden acceleration and/or deceleration, or the power generated by an impact, such as a baseball base runner slamming into a catcher at home plate, or a football running back being tackled by a linebacker.

FIG. 1A shows an illustrative system 100 configured to modify live media before it is broadcast. A broadcast computer 102 may receive input from any of the types of recording equipment mentioned above. In particular, FIG. 1 shows a broadcast microphone 103, video camera 104, field microphone 105 and telemetric equipment 106 being used to record the live event 107 taking place on a playing field within a stadium in view of fans of the teams that are playing a sports game. The input data received from the various recording equipment during the live event may be: (i) stored in a memory of the Broadcast Computer 102 and/or (ii) processed by an internal processor of Broadcast Computer 102. Broadcast Computer 102 may also include various software applications that allow input video and audio feeds to be edited into a linear, broadcast program before being transmitted to an output device 140. Broadcast Computer 102 may also be connected to Broadcast Editing User Interface (UI) 110, which may be comprised of various input devices such as a touch screen, mouse, keyboard, microphone, and the like which allow a broadcast editor (in some implementations, a human broadcast editor) to interface with the Broadcast Computer 102. In some embodiments, the broadcast editor may be hardware and/or software associated with the Broadcast Computer 102 (for example, a device or component of the computer 102, or software stored in a memory connected to computer 102), or may be a separate component. The Broadcast Computer 102 may also store broadcast software and applications that allow the broadcast editor to manipulate and/or modify the video and/or audio footage transmitted from the recording devices before broadcasting the live event to an output device 140 for broadcasting to a plurality of viewer devices (such as a computer screen or a high-definition television set).

Broadcast Editing UI 110 may also be connected to other editing hardware such as to a Broadcast Editing Device 120. The Broadcast Editing Device 120 may allow the broadcast editor to cut and/or control the speed of the input video and audio feeds. As mentioned above, in an implementation, the present systems and methods are especially concerned with applying slow motion effects to live broadcast video footage. An example of existing technology that has the ability to apply such effects to input video and audio data is the ST300-DSR1K-T Slow Motion Controller for the Sony DSR-DR1000 camera, which controller is manufactured by the DNF Controls Corporation.

Broadcast Editing UI 110 may also be connected to other editing hardware such as to a Broadcast Mixing Device 130. Broadcast Mixing Device 130 may allow the broadcast editor to (i) combine separate audio feeds into one audio output, (ii) combine audio and video feeds, (iii) mix graphics into the video feeds, (iv) allow switching between video and audio feeds, and the like. An example of such mixing technology may be found in the Indigo AV Mixer manufactured by the Grass Valley Company. In addition, there are a variety of other devices relevant to broadcast production that may or may not be utilized by the system 100. For example, devices currently used in the field of broadcast production include video tape players and recorders (VTRs), video servers and virtual recorders, digital video disk players (DVDs), digital video effects (DVE), audio mixers, audio sources (for example, Compact Discs (CDs), Digital Audio Tapes (DAT's), and video switchers). Any one of these devices may or may not be included in the present system and connected to either Broadcast Computer 102 or Broadcast Editing UI 110.

In some embodiments, broadcast media (for example, video signals and audio signals output via radio, satellite, cable, the internet, and the like) may be transmitted to an output device controlled by the broadcaster and/or the viewer. Such output devices allow the broadcaster and/or viewer to watch the broadcast media, and may be one of a CRT display, an LCD display, a television set, a cell phone, a personal digital assistant (PDA), a laptop computer, a desktop computer, a portable digital game device, a set of speakers, and the like.

2. Processes

As explained above, a delay between the broadcast of an event and the occurrence of the actual live event may be used in the present systems and methods. Currently, networks and broadcasters use about a seven second delay when broadcasting live events so that editors have enough time to edit out vulgar material and to correct technical problems with little or no disruption appearing in the broadcast for the viewer. A similar delay, or in some embodiments a longer delay, may be used to allow one or more modification effects to be applied to a live media feed.

Figure 1B:
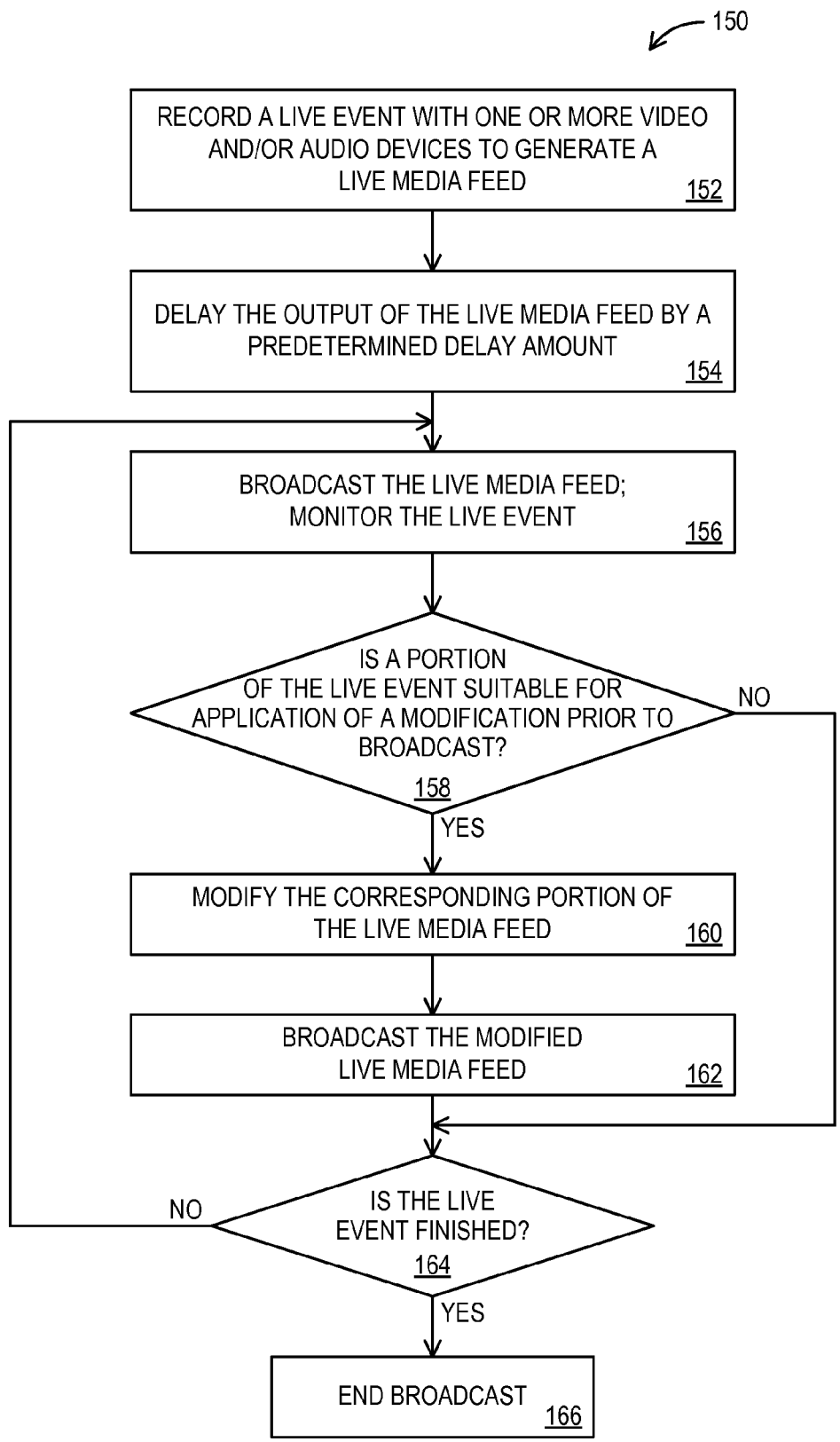
FIG. 1B is a simplified flowchart of a process for broadcasting a modified media feed of a live event according to an embodiment.

FIG. 1B is a simplified flowchart of a process 150 for modifying the video footage and/or the audio footage of a live event before it is broadcast to viewers, which may be utilized in accordance with the system 100 of FIG. 1A. In step 152, a live event is recorded using one or more video devices and/or audio devices to generate a live media feed (which may include both video footage and audio footage). The broadcast of the live media feed is then delayed 154 by a predetermined delay amount (for example, 30 seconds). Next, the live media feed of the event is broadcast 156 and a broadcast editor monitors the live event during the broadcast. If the broadcast editor determines 158 that a portion of the live event is suitable for application of a modification effect, then the process includes modifying 160 the corresponding portion of the live media feed and then broadcasting 162 the modified live media feed. If the live event finishes 164, then the broadcast is ended 166. If the live event is not yet finished 164, then the process includes returning to the broadcast 156 of the live media feed, and the broadcast editor continues to monitor the live event for suitable portions to modify by utilizing one or more modification effects.

Referring again to step 158, if the portion of the live event is not worthy of modification, then a check is made in step 164 to determine if the live event has finished, and if so the broadcast ends 166. If the broadcast has not ended in step 164, then the process branches back as explained above, and the live media feed is broadcast while the broadcast editor continues to monitor the live event 156. The process 150 continues for the duration of the broadcast of the live event (which may be the broadcast of a modified live media feed).

Many of the embodiments discussed herein require a broadcast editor to mark the footage of a live broadcast with one or more identifiers such as cues as the event is being recorded, and before that portion of the live event is broadcast. A cue is an identifier or marker that may be utilized by the broadcast computer to apply one or more modification effects to the live media footage (which modification effects may be applied to the video footage and/or to the audio footage). For example, a broadcast editor may mark a broadcast with two cues; the first cue instructs the broadcast computer to slow the video output rate by 30% from that point onward, and the second cue instructs the computer to resume the normal video output rate. Thus, in some embodiments, identifiers such as cues may be used in sets or pairs to designate the beginning point and the ending point of a modified portion of the live media.

In some embodiments, a broadcast editor may be required to assign one or more modifying effects to the cues. For example, a broadcast editor may mark an edited live media feed with a plurality of cues and assign a modifying effect to the cues afterwards; and/or a broadcast editor may have a choice of a plurality of different modifying effects that can be assigned to a cue in combination; and/or cues that have not been assigned with a modifying effect may be disregarded by the computer. In some implementations, the broadcast computer may assign a predetermined default modifying effect to a cue unless otherwise instructed by the broadcast editor. For example, a cue may default to an instruction to either (i) turn on a slow motion effect if the video is broadcasting at normal broadcast speed, or (ii) turn off or cancel a slow motion effect if the video is broadcasting at slow motion broadcast speed. An unassigned cue could automatically resume normal broadcast settings, or one or more cues may indicate a length of audio or video footage to be deleted from a broadcast of a live event (for example, video footage that shows the end of an inning of a baseball game wherein the players are walking in from the field to a dugout is typically not important to the game, and thus cues may be utilized to identify such video footage for deletion from the broadcast). It should be noted that such default modifying effects may help in accounting for the increased broadcast delay time created by broadcasting extended live slow-motion media (for example, a 3-hour broadcast may not exceed a 3-hour time frame).

In some embodiments, particular cues may be assigned predetermined modification effects. For example, a broadcast editor may have a plurality of different kinds or types of cues available, each with a particular assigned broadcast modification effect. In another example, when a broadcast editor desires to change the camera angle of a broadcast, he or she may insert one type of cue (for example, a "camera one" cue may show a view from behind the plate during a baseball game, a "camera two" cue may show a view from behind the pitcher's mound, a "camera three" cue may show a view from behind first base, and so on), and the broadcast editor may also insert another type of cue when he or she desires to slow down the broadcast speed (for example, to show a play at second base in slow motion).

In some embodiments, a cue may instruct the broadcast computer to switch to an alternate output instead of modifying the footage. For example, when the broadcast computer detects a cue it may switch automatically to modified media footage of an event. In another example, when the broadcast computer detects a cue it may switch automatically from footage filmed using a different camera angle or taping speed (for example, a cue may switch to a slow motion video feed sent from a slow motion camera).

In some embodiments, before or after modifying media footage of an event, the broadcast editor may assign that media footage to a cue and insert it into the edited live media feed. In some embodiments, the broadcast editor may be required to insert a second cue assigned to the edited live media feed to mark where the unmodified footage should resume once the modified media footage is over. In another example, when the broadcast computer detects a particular cue it may insert a previously recorded clip associated with that cue (for example, a "blooper" cue may mark where an animated overlay clip is to be automatically inserted).

Broadcasting identifiers such as cues may be applied to a live media feed using the broadcast editing UI 110 illustrated in FIG. 1A, other devices connected to the broadcast editing UI, or devices independently connected to the broadcast computer.

It should be noted that the broadcast computer 102 may provide the broadcast editor with a variety of live media feeds (or footage) to utilize in creating an edited live media feed. In such an embodiment, the broadcast editor can choose which of these feeds to edit and use to create the final version of the live media feed to output for broadcast. For example, the broadcast editor may be watching the events as they occur in real time; or the broadcast editor may be viewing one or more versions of the broadcast that the broadcast editor can manipulate and/or modify (for example, fast forward, rewind, pause, apply one or more modifying effects, insert cues, and the like); or the broadcast editor may be watching the broadcast live media as it is being broadcast (at a delay).

In some implementations, a media feed may or may not be a conventional Audio/Video output. For example, in some embodiments, a media feed may be presented as a timeline, a code, groups or segments of clips, and the like.

In some embodiments, the broadcast editor uses a broadcast editing user interface (UI) while watching a live event occur in real time to insert cues. At any point during the live event, the broadcast editor may provide an input (for example, touches a touch screen, presses a button, speaks into a microphone, turns a dial, flips a switch) that places an identifier such as a cue at a corresponding point on the live media feed. For example, if a broadcast is delayed by 30 seconds and the broadcast editor presses a button 30 seconds from the start of the live event, then a cue is placed in the live media feed which will be activated at one minute from the start of the event, or 30 seconds into the broadcast media.

In some embodiments, the broadcast editor may insert a cue into an edited media feed by rewinding or fast forwarding to a desired point in the received live media feed. For example, a broadcast editor viewing an event occurring in real time may rewind the live media feed and provide an input to indicate a cue at a desired point in time. If the broadcast delay is 30 seconds, then the editor could rewind the live media feed to insert a cue as far back as 30 seconds prior to the currently occurring live events (since anything past 30 seconds will already have been broadcast). It should be understood, however, that in some embodiments, the editor may be prevented from rewinding footage past the point of that which has already been broadcast.

In some embodiments, the broadcast editor may activate cues as the live media feed is broadcast. For example, the broadcast editor sees an event happen in real time and then waits until it occurs in the broadcast version of the live media feed. When the play begins in the broadcast of the live media feed, the broadcast editor inserts a cue (or a command) that may be used as a trigger to identify the point at which a modification effect should be made to the broadcast.

One or more cues may be inserted automatically by a broadcast computer system. In some embodiments, a broadcast editor may be required to positively accept an automatically inserted cue before it is activated in a broadcast. Alternatively, an automatically inserted cue may be activated during a live media broadcast unless it is overridden by a broadcast editor. For example, a "camera cue" may be inserted each time a camera feed switches. In a specific example concerning a baseball game broadcast, a camera cue may automatically be inserted when a broadcast editor switches from the center field camera feed to the high home plate camera feed (which may occur, for example, because the batter hit a pitched baseball).

A cue may be automatically inserted based on audio recorded by a microphone. For example, a "zoom cue" may automatically be inserted during a football pass play immediately after the quarterback releases a long throw downfield when the crowd noise in a football stadium exceeds 90 dB or goes up by more than 10 dB in a short period of time, so that a camera zooms in on a receiver running down the field who is trying to catch the football.

In some embodiments, a cue may be inserted based on sensors that track objects that move on a playing field. For example, in the context of a baseball game, a video camera or radar gun may be used to determine each time a pitch is thrown. Based on this data, a computer system may insert a cue at the start and/or near the end of each pitch. In another example, a RF transponder embedded in a soccer ball may be used to track the position and velocity of the soccer ball. A computer system may monitor this data and cause a cue to be inserted if the soccer ball is within ten feet of the goal and is moving with a velocity of at least 50 feet per second towards the goal. In another example, a cue may be automatically inserted when sensors in the bleachers detect fans suddenly standing (for example, over 60 percent of people in a baseball stadium stand up quickly as a ball is hit and it appears that the hit may be a home run). Or, during a baseball game, a "base hit" cue may be automatically inserted when sensors embedded in a baseball detect the strike of a bat against the ball. As stated above the broadcast editor may be required to confirm whether or not the cue is to be activated when broadcast. Thus, in the same example, if a "base hit" cue is inserted because a bat connected with a pitched ball, the broadcast editor viewing the game may identify that hit ball as a foul ball and then override the automatically inserted "base hit" cue.

It is also contemplated that in some systems there may be different types of cues. For example, some implementations may include a starting cue that is used to mark the start of an event, and an ending cue that is used to mark the end of an event. Typically, a starting cue will be paired with an ending cue (thereby indicating the time and duration of the event), but it is also possible to have multiple starting cues paired with a single ending cue (which may be used to allow the broadcaster to choose whether to show the long version or the short version of an event). Similarly it would also be possible to pair multiple ending cues with a single starting cue or multiple starting cues with multiple ending cues. Alternatively, there may be no pairing at all of starting and ending cues.

Some systems may utilize an event cue to mark the moment when an event occurs (for example, when a baseball bat comes in contact with a pitched baseball). Broadcast modification effects or additional cues may then be inserted based on a predetermined or adjustable time window before or after the event cue (for example, 0.5 seconds before a baseball hit, 1 second after the baseball hit, 2 seconds before a hockey goal, and the like). (It is possible for cues to be accurately place before a particular act occurs because of the broadcast delay that is added to the media feed before it is broadcast).

In some embodiments, a broadcast editor may not use cues to modify a broadcast; rather various known editing tools may be used to alter the audio and/or visual signal output.

Whenever the use of cues is discussed herein, it should be understood that a cue may be an editing command or instruction input by the broadcast editor, and the broadcast editor may use one or more devices, such as a broadcast editing device, a broadcast mixer, a broadcast editing UI, broadcast editing software, and the like. These devices may be connected directly to the broadcast computer or to the broadcast editing UI. The edited media may also be output to the broadcast computer and queued for release after the broadcast delay has lapsed, or in some embodiments the broadcast editor may modify the live media feed as it is being broadcast.

FIGS. 2A and 2B depict a first timeline 200 and a second timeline 210 to illustrate a simplified process for applying a broadcast modification effect to a live media feed. The timeline 200 of FIG. 2A depicts a live event occurring in real time from a start at 0:00 and the timeline 210 of FIG. 2B depicts the broadcast of the live event as it is broadcast after insertion of a 30 second delay. A broadcast editor watching the live event occur in real time interfaces with the broadcast computer to control the live media feed (or the edited live media feed) to create a finalized version to be broadcast (a modified live media feed). According to one process, the broadcast editor sees Event 1 occur in real time and then marks Event 1, which lasts for 10 seconds, in an edited media feed (during the broadcast delay) using a Cue 201 and a Cue 202. When the media for broadcast reaches Cue 201 (at 01:20), which is the start point for modification, an instruction is transmitted to the broadcast computer to apply a slow motion effect. (This creates an alternate presentation of Event 1, resulting in "Modified Event 1" 205 of the timeline 210.) When the modified event reaches Cue 202 (at 01:30), which marks an end point of the modification, the media resumes normal broadcast speed. Thus, as illustrated by the heavy dash-dot-dash line 206 shown in FIG. 2B, the Modified Event 1 (205) has a duration that is greater than 10 seconds because a slow motion modification has been added. Accordingly, the result is a modified live media feed that has been extended to include the 30 second delay plus the extra time that was added when applying the modification to Event 1.

FIGS. 3A, 3B and 3C depict three timelines 300, 310 and 320, respectively, to illustrate another implementation of a process for modifying a live media feed prior to broadcast. In the timelines, Event 1, Event 2 and Event 3 each represent a play of interest (for example, a pitch delivered by the pitcher, a down in football, and the like). In this embodiment, the editor watches the event (such as a baseball game) as it occurs in real time (as shown in timeline 300 of FIG. 3A) and as it is being filmed (with or without a recorded audio component), which starts at time 0:00, and the event is recorded in seconds. In this example, there is a thirty (30) second delay 322 between the live event and the broadcast of the live media feed (FIG. 3C, the broadcast timeline 320). As shown in FIG. 3B, while watching the event in real time, a broadcast editor substantially simultaneously marks an editing version of the live media with a plurality of cues (shown as C 301 to C 306) at various elapsed times as depicted below each of Event 1 to Event 3 on Timeline 310. Each cue marks either the beginning or the end of an event. For example, C 301 marks the beginning of Event 1 at time 00:50, and C 302 marks the end of Event 1 at time 01:00. In addition, C 303 marks the beginning of Event 2 at time 01:50, and C 304 marks the end of Event 2 at time 2:00. Lastly for this example, C 305 marks the beginning of Event 3 at time 2:50, and the cue C 306 marks the end of Event 3 at time 3:00. After the cues have been inserted, the broadcast editor may instruct the broadcast computer to assign a broadcast modification effect to any one of the cues, or to disregard them. Referring to FIG. 3C, the Timeline 320 shows the result of such a process. Although in this example most cues apply no change, C 303 at time 01:50 has been selected so that Event 2 will be modified, which results in "Modified Event 2" 325 at a start time of 2:20 and having an end time of 02:40. The cue C 304 in the timeline 310 (FIG. 3B) marks the end of Event 2 and is used to restore the broadcast's unmodified or traditional settings, which occurs at time 02:40 in timeline 320 (FIG. 3C). As shown, "Modified Event 2" 325 is approximately 20 seconds in duration (see FIG. 3C, Timeline 320), whereas unmodified Event 2 315 (see FIG. 3B, Timeline 310) is approximately 10 seconds in duration. Therefore, the modification chosen for Event 2 elongated, or stretched out, the broadcast of the live media feed for that event by about ten (10) seconds, for example, by broadcasting the play defined by Event 2 in slow motion and/or from multiple camera angles. Thus, modified event 2 has an associated modified event delay of ten (10) seconds, and this modified event delay is added onto the length of the broadcast of the live media feed.

Figure 3D:
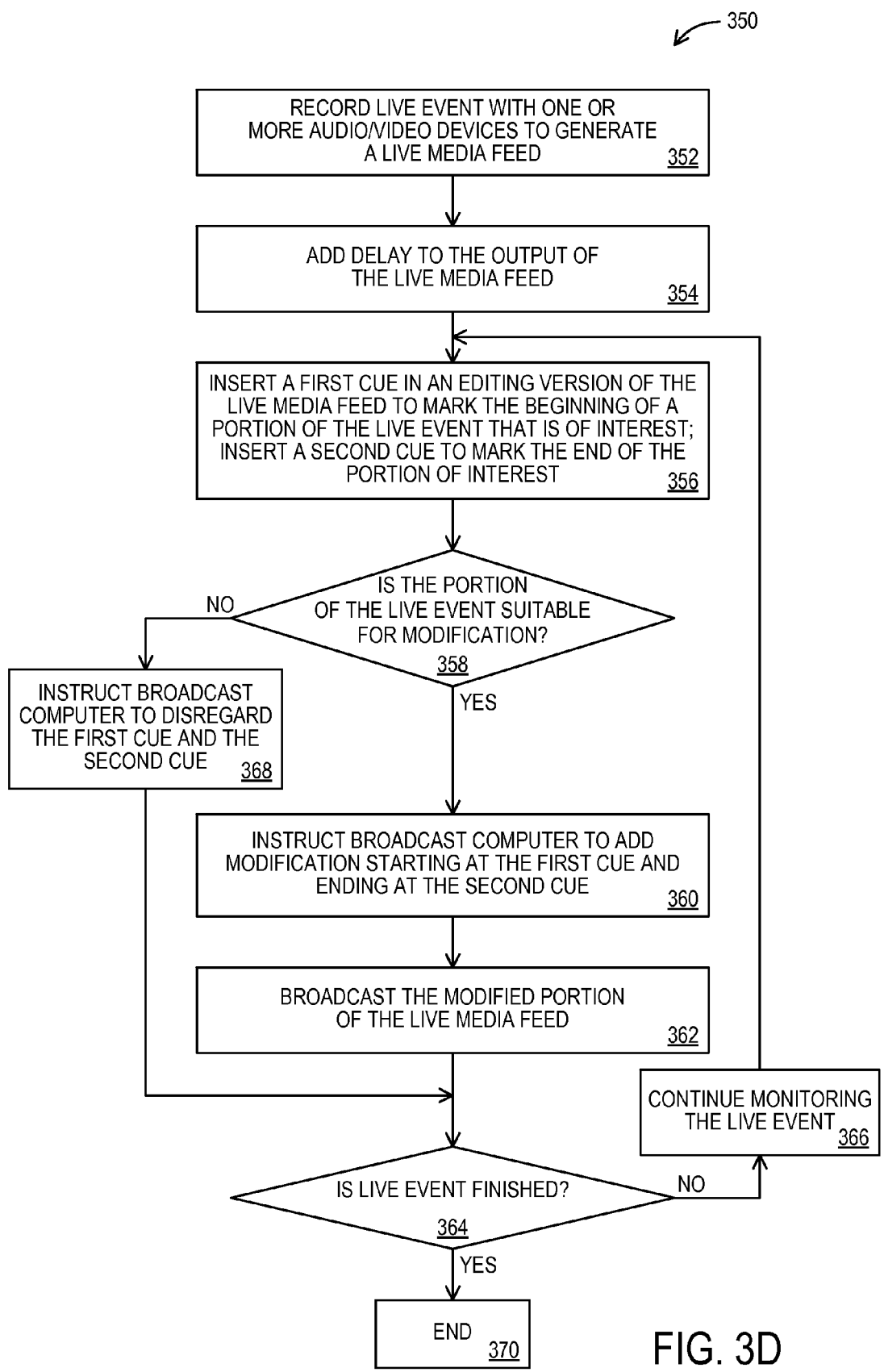
FIG. 3D is a simplified flowchart illustrating a process for broadcasting a modified media feed of a live event according to an embodiment.

FIG. 3D is a simplified flowchart illustrating a process 350 for broadcasting an edited media feed of a live event. A live event is recorded 352 with one or more audio/video devices to generate a live media feed. Next, a delay is added to the live media feed 354 of the live event (before broadcast). While the live event is being recorded (and broadcast after the delay), a broadcast editor inserts a first cue 356 in an editing version of the live media feed to mark the beginning of a portion of the live event that is of interest (such as a pitch to a batter who has a three balls and two strikes count), and inserts a second cue to mark the end of the portion of interest (which may be the result of the pitch, for example, the batter swinging and missing the baseball for a called strike three). Next, the broadcast editor determines 358 if the portion of the live event is suitable or worthy of modification (for example, a consideration may be that the pitch is worth showing in slow motion even if the batter swings and misses the baseball because this particular batter has a high hitting percentage off this pitcher). If a determination is made to modify that portion of the live event, an instruction is provided to the broadcast computer to add the modification starting at the first cue and ending at the second cue (for example, a slow motion effect is added to that portion of the live media feed, which in the above example is a pitch to a batter in a baseball game). When the editing version of the live event is ready for broadcast (that is, the delay has expired and the first cue is ready), then the modified live media feed is broadcast 362. Next, if the live event is not finished 364, the broadcast editor then continues monitoring the live event 366, and the process branches back to step 356 wherein the cues are inserted when a portion of interest occurs during the live event. If, in step 358 the portion of the live event is determined not to be suitable for modification (for example, in the example above, the batter fouls off the three balls and two strikes pitch), then the broadcast computer is instructed to disregard 368 the first and second cues. The process would then continue with the broadcast editor continuing to monitor the live event 366 if the live event is not finished 364. Of course, if it is determined in step 364 that the live event is finished (for example, a post game show has started) then the process ends 370.

In the embodiment explained above with regard to FIGS. 3A-3D, it may be necessary to assign a specific type of identifier to each individual cue so that the broadcast editor can easily and quickly define a start cue and end cue among many "blank" cues or those cues for which no modifications will be processed. For instance, if an editor recently inserted six (6) cues into a broadcast, and wants to apply a slow motion effect that starts at the third cue and ends on the fourth cue (in the example of FIG. 3B, this would correspond to "Event 2" 315), the editor must identify the third cue and the fourth cue in some manner to the broadcast computer. In order to provide such information, each individual cue may be assigned a number, and/or each individual cue may be identified by the time it marks in the broadcast (for example, cue 01:50 and cue 02:00), and/or a starting cue may be designated in a different manner from an ending cue, and/or the portion of footage between a start cue and an end cue may be assigned an identifier such as "Event 2", and/or each individual cue in a string of cues may be assigned a name, and/or each individual cue in a string of cues may be of a certain color (for example, start cues may be red and end cues may be blue, or to designate a pair of cues defining an event the start cues may be a lighter color than the end cues of a set of cues, and the like). Various combinations of the above identification methods may also be used to mark and/or identify cues and/or events for modification.

FIGS. 4A, 4B and 4C include timelines 400, 410 and 420, respectively, that together illustrate yet another implementation of a process for modifying a live media feed. In FIG. 4A, a broadcast editor watches the live event as it occurs (as depicted by timeline 400), and decides to modify "Event 1" 405 that occurs between time 1:00 and 1:10 from the start of filming 0:00. In this example, there is a thirty (30) second delay 422 between the live event and the broadcast (see FIG. 4C, broadcast timeline 420). As depicted in Timeline 410 of FIG. 4B, the editor marks the end of the Event 1 (which may be a play of a football game or other sports game, for example) with "Cue 401" and then rewinds an editing version of the live media feed approximately ten (10) seconds to the beginning of Event 1. The editor then marks the beginning of Event 1 with the designation "Cue 402" to define "Modified Event 1" 415 (which may be a selected sports play, for example). FIG. 4C shows the Timeline 420, which depicts the real time live media feed (which is the broadcast version, or the modified live media broadcast feed). At Cue 402, which occurs at time 01:30, modifying effects are applied to Event 1 to generate "Modified Event 1" 425, which will be a part of the broadcast media. In this example, the broadcast settings are returned to normal when the broadcast reaches Cue 401 at time 01:50 of the broadcast. As illustrated, "Modified Event 1" 425 is approximately 20 seconds in duration (FIG. 4C, Timeline 420), whereas the unmodified Event 1 415 (FIG. 4A, Timeline 400) is approximately 10 seconds in duration. Thus, in this example, the modification that has been chosen for Event 1 elongated (or stretched out, or added to) the time of the broadcast media of the sports play by an additional ten (10) seconds, which may have occurred because the sports play was broadcast as Modified Event 1 in slow motion and/or from multiple camera angles (which may be inter-spliced together to form a montage effect of the sports play).

In another embodiment, the broadcast editor may not use cues. Instead, the broadcast editor may rewind the editing version of the broadcast and manually apply a broadcast modifying effect during the broadcast delay. Thus, when the broadcast reaches the beginning of Event 1 after the delay expires, Modified Event 1 is output and broadcast.

FIGS. 5A and 5B depict two timelines 500 and 510 to illustrate another implementation of a process for modifying footage of a live media feed, wherein multiple broadcast effects may be applied to a single event in the live media feed. As shown in FIG. 5B, in this example there is a thirty (30) second delay 512 between the live event and the broadcast of the live event. In this case, the broadcast editor watches the live event (FIG. 5A) and decides to modify "Event 1" 505 which starts at time 01:00 and ends at time 01:15. The broadcast editor uses the broadcast delay of thirty (30) seconds to plan and/or decide how to modify Event 1 and to implement the changes. For example, the broadcast editor (which may be a device or could be a human editor) may have enough time to review feeds from several available camera angles, and/or to create a synthetic image, and the like. As shown in Timeline 510, the broadcast editor applies a modification, designated as "Mod.1" beginning at point 514 (at elapsed time 01:30) of the broadcast live event. (The "Mod. 1" broadcast modification effect is applied alone during this portion of Event 1 and lasts for approximately ten (10) seconds.) Similarly, the broadcast editor applies another modification effect, called "Mod. 2" at point 514 (at elapsed time 01:40) for approximately fifteen (15) seconds. The result is that, from point 516 to point 518, the "Modified Event 1" 520 is altered by the combination of "Mod.1" and "Mod. 2". At point 518, the broadcast editor turns off both "Mod. 1" and "Mod. 2", resulting in the end of "Modified Event 1" 520 and also restoring the live media feed's traditional or conventional broadcast settings.

2.1 Triggering Events

In some embodiments, a human broadcast editor may use his or her judgment when deciding whether or not to apply a modification effect to a portion of the live media feed of a live event before it is broadcast. Therefore, the broadcast editor may be watching a live event occur in real time and be picking out specific sub-events that he or she thinks would be better if broadcast using a special effect such as slow motion or a synthetic camera angle. For example, the broadcast editor may only modify the most exciting events, and/or may only modify "game changing" events. In order to choose which events to modify, the broadcast editor may only modify an event according to a specific set of rules. Such rules may change according to the event being broadcast. For example, for a football game, slow motion may be used any time a player gets tackled. In other examples, for a baseball game, slow motion is used any time there is a full count; and for a soccer game, slow motion is used any time a player takes a shot on goal. A plurality of rules may be used for one single event, for example, in a baseball game, slow motion may be used any time a player (i) catches the ball, (ii) steals a base, (iii) is involved in a close play at any base, (iv) hits a home run, or (v) strikes out.

In some embodiments, modification triggering events may be recognized by a computer receiving real time telemetric or audio data from recording equipment. For example, laser sensors around the cup on a putting green on a golf course may recognize when a ball is within two (2) feet of the cup and send a signal to a broadcasting computer, or RFID sensors may transmit a signal when a base runner comes within ten feet of home plate, or a video camera that is sending footage to the broadcast computer also tracks the trajectory of batted baseballs and recognizes when a potential home run ball is hit. Thus, in some embodiments, a home run ball (during a baseball game) may be determined before the ball actually leaves the park based on its trajectory. Other cues that could be used to determine events that may be worthy of being modified may include the sound a baseball bat makes when striking a baseball, the sound of a tennis racquet hitting a ball, or the sound a golf club makes hitting the ball. Another example of a possible trigger to modify an event is the sound of the crowd cheering wildly (indicating an important event occurring, such as a quarterback breaking towards a potential touchdown).

In some embodiments, a broadcast editor may be prompted to modify a live media feed when one or more modification triggers occur. For instance, a broadcast editor may be prompted or reminded to slow down the broadcast speed every time a football player is close to scoring a touchdown (for example, whenever a player crosses the 5 yard line.) In some embodiments, a trigger causes an alert to be output to the editor that suggests the editor modify the live media feed prior to broadcast. For example, an alert may include a flashing light, a dialogue box on an editor's computer screen, a beep or another type of audio signal, or a combination of the above. In other examples, the alert may be output via the broadcast editing UI, or the alert may be output via a broadcast editing device, or the alert may be output via an output device associated with the broadcast editor.

In some embodiments, a triggering event may be recognized by the broadcast editor and a modifying effect may be input manually. For example, the broadcaster sees a trigger event and selects one of a plurality of preset broadcast modification effect cues or commands. The broadcast modification effect may then be applied based on modification effects associated with a selected cue or command. For instance, by selecting a particular cue, the editor chooses a "coaches reaction" modification effect defined by a 70% slowdown rate, a 20% zoom, and a split screen showing the coach's reaction, to show the viewer the coach's facial expressions and body language as the play progresses. In other examples, the broadcast editor sees a trigger event and then may modify the broadcast as the editor sees fit, and/or a network may employ one editor who has a talent for recognizing when an event is suitable for application of a modification effect and performs the modification himself or alerts other editors to do so. In some examples, triggers may be recognized by a computer that overrides the controls of a cameraman's camera and/or an editor's controls, to automatically slow video and/or audio footage or to implement other visual and/or audio effects.

In some embodiments, a modification triggering event may start one or more automatic modifications performed by the broadcast computer. Each type of triggering event may cause a unique set of modification rules to be employed. For example, whenever a tennis ball lands less than six (6) inches from a boundary line, as determined by an RFID sensor, a Laser Range Finder, a Camera, or another type of sensor, the one (1) second of video before and after the ball lands is automatically slowed down and/or the camera is automatically zoomed in. In another example, whenever a baseball base runner is stealing second, the broadcast includes a diagonal split-screen shot wherein the top half of the shot shows the camera angle covering the baseline between first and second and the bottom half of the shot shows the camera angle covering the catcher.

In some embodiments, a triggering event may cause an alert to be sent to the broadcast editor and cause one or more automatic live media modification effects to be selected based on a set of rules. This allows the broadcast editor time to review the modified live media (to determine if the selected modification effect is acceptable and/or suitable), and/or it allows the broadcast editor the time to apply some other modification effect(s). For example, when a golf ball comes within two (2) feet of the cup of a golf hole, the video broadcast automatically slows and the screen splits, however, the broadcast editor chooses which camera angle to put into each part of the split screen. Thus, broadcast modification effects applied to live media footage may be generated automatically and then presented to the broadcast editor for approval and subsequent broadcasting. If a broadcast editor disapproves of a particular modification effect (for example, because automatic triggering resulted in a modification effect being applied at an inappropriate time), then the modification effect may be discarded or overridden. In another example, two or more broadcast modification effects may be presented to the broadcast editor and the editor may be prompted to choose which one (if any) should be used in the broadcast of the live media. Thus, for example, when a run is scored in a baseball game, the broadcast editor may be prompted to select whether to apply a 10-second split-screen slow motion effect (which was generated automatically by a first computer system), or to apply a 15-second synthetic image "bullet time" effect (which was automatically generated by a second computer system), or the editor may chose not to apply any such modification effects (for example, in a game where the home team is leading by a score of ten runs to zero runs, there may be reason to refrain from modifying the event that resulted in the scoring of an eleventh run).

In some embodiments, the modified live media event and the triggering event may or may not be the same event. Some example triggers and the related or corresponding broadcast modification effect that would be applied appear immediately below.

A triggering event may be a home run and the broadcast modification effect may be applied to the pitch and to the hit. The triggering event may be an extra base hit and the broadcast modification effect may be applied to a near miss of the baseball by a fielder during the play. The triggering event may be a 70-yard touchdown catch and run by a wide receiver and the broadcast modification effect may be applied to the quarterback scrambling away from a tackle and then making the throw instead of to the wide receiver catching and running with the ball. The triggering event may be a diving save by a hockey goalie and the broadcast modification effect may be applied to the offensive player's skating move around two defensive players in front of the goal mouth instead of the save by the goalie. The triggering event may be a golf ball landing in a small pond on a golf course and the broadcast modification effect may be applied to the golfer's golf club swing rather than to the ball landing in that water hazard of the golf course. The triggering event may be a served "ace" in a tennis game and the broadcast modification effect may be applied to the server's toss of the ball and strike of the ball by the tennis racket during his or her serve instead of being applied to the tennis ball landing in the service box on the court and passing by the opposing player.

It should be understood that a wide variety and number of triggering events can be used for each sport or sporting event. Generally, a triggering event may be defined as any indication that a play or any particular portion of the live event is worthy of broadcast modification effect. The viewer experiencing a broadcast modification effect will likely not know or realize why the broadcast event is being modified in any particular manner until after the play is completed. In other words, a viewer may not necessarily be able to predict the outcome of a play (for example, whether the runner will score from third base on a hit, or be thrown out at home plate) based on the fact that the broadcast he or she is watching suddenly becomes modified. For example, when the broadcast of a football game reaches a point where a running back receiving a handoff goes into slow motion, the viewer may initially assume that it indicates a big play or favorable play for the offense. However, the slow motion broadcast could be of a resulting play that includes a fumble by the running back that is recovered by the defense, or of a brain-jarring hard tackle by a linebacker that results in a loss of yardage on the play, and the like (such occurrences favor the defense). Thus, in the example of a football game, broadcasters and/or editors should be careful to not only highlight successful offensive plays, but also successful defensive plays. In general, therefore, broadcasters and editors should modify both successful events and failed attempts, in order to keep the viewer of the broadcast guessing so as to keep interest in the game or other event high.

2.2. Types of Broadcast Modification Effects

As explained above, the broadcast delay gives a broadcaster the ability to anticipate important events by having a broadcast editor watch the real time event and look for triggering events such as impressive sports plays, or the events leading up to important moments in a game or event, so that an appropriate type of modification can be applied to a live media feed of the event. The broadcast delay is also utilized to give the broadcast editor the time to alter or modify the broadcast output. Thus, if a human broadcast editor is used, it would be prudent to ensure that the broadcast editor is an expert or has adequate experience with any rules, regulations, plays and/or intricacies associated with watching the particular type of live event that he or she will be responsible for modifying. For example, a broadcast editor who is a former major league baseball coach and/or former major league baseball player would be well suited to watching and modifying a live media feed of a major league baseball game during the broadcast of a particular major league game. But the same person might not perform as well if he or she were to be responsible for modifying portions of the broadcast of a major league soccer game (especially if the broadcast editor had no experience with and/or did not know the rules of major league soccer). Using the processes described above, broadcast editors can therefore apply one or more desired modifications to portions of the live media feed of a broadcast. The goal in altering or modifying the live media feed is to make viewing the broadcast of a game or sporting event more fun and exciting. Below are some contemplated modifying effects for broadcasts.

2.2.1 Slow Motion

In some embodiments, the video and/or audio speed of a live media feed may be slowed to provide the viewer with the opportunity to fully absorb an event's significance and also to build a greater amount of anticipation and enjoyment concerning the outcome of a portion of the live event. Slow motion effects may be achieved using a variety of methods, and various examples are discussed immediately below.

A broadcast editor may utilize the broadcast computer to digitally alter the live media feed. For example, the broadcast editor may use a video processing program stored on the broadcast computer to slow the video output of the live media footage. In some embodiments, slow motion cues may be applied to the broadcast output to control the speed of the video. To slow the live media footage of a play, the broadcast editor may use a broadcast editing device manufactured by the DNF Controls Company such as the ST300-DSR1K-T Slow Motion Controller for the Sony DSR-DR1000 (manufactured by Sony Corporation). The broadcast editor may also switch to a different video feed to acquire slow motion effects. For instance, Camera 1 may be taping a live event in normal speed, and a Camera 2 may be a slow motion camera such as the Sony HDC-3300 Slow Motion Camera manufactured by Sony Corporation, which is taping the same live event in Slow Motion. When the broadcast editor wants to use a slow motion effect, he or she just switches between the feeds from Camera 1 and Camera 2.

Rather than slowing down an entire play or a portion of a play, a more subtle change may be made by implementing multiple slowdown portions and multiple sped-up portions in one single play. Similarly, a play's speed may be altered gradually at any time to enhance the effect. For example, a live media feed that is modified and broadcast in slow motion can be slowed further to accentuate particularly critical moments of an exciting sports play. For example, recorded footage of a football running back breaking tackles and scoring a touchdown is cued with multiple slow motion "sub-events". A first sub-event may be modified and presented at a speed slightly slower than normal, but then a second sub-event may be slowed down even more, such as when the running back breaks through a hole in the defensive line, which thus turns a split second decision by the running back and his maneuver into a couple of seconds of video footage. The video speed may then be returned to normal at a third sub-event after the running back is through the defensive line, and then slowed down again at the point of a fourth sub-event as a linebacker dives and makes a grab for the running back who then breaks free from the attempted tackle. The video speed may then again be returned to normal during a fifth sub-event, only to be slowed down again during a sixth sub-event when the running back is hit by a strong safety coming from across the line of motion of the running back, which hit causes the running back to spin slightly to absorb the hit but not to go down, and then to regain balance by posting his free hand on the ground, and lastly to dive for the end zone. This play would normally last (or be over in) approximately 4 seconds (in real time), and much of the action (the nuances of the play) may go unnoticed at a real time speed. However, by applying slow motion modifications at the right moments during the play, as outlined in the above example, the details are presented clearly, the running back's performance lasts longer, and the overall result is that the football play is more exciting for the viewer to watch.

2.2.2 Computer Generated Imagery

In some embodiments, Computer Generated Imagery (CGI) may be used instead of, or in addition to, the actual event to provide the viewer with special effects such as unconventional camera angles. For example, if an outfielder is making a diving catch, but his body blocks the camera's view of the ball dropping into his glove, images generated by a computer can be used to show a different and/or better angle of the play for the viewer. A computer processor running CGI software can construct a 3 Dimensional scene by using a combination of the real video footage, live-recorded telemetry data and stored data. In some embodiments, CGI software, such as the Electric Image Animation System 3D Rendering and Animation Software for Macintosh and Windows, manufactured by EI Technology, LLC may reside on the broadcast computer and can be accessed by the broadcast editor via the broadcast editing UI.

In some embodiments, due to the large amount of processing power needed to create and render synthetic images immediately for broadcast, CGI software may be stored in a networked computer separate from the broadcast computer. Therefore, the editor may have to retrieve the synthetic images from the networked computer when preparing the live media to be broadcast. In some other embodiments, the synthetic images may only be prepared at the request of the broadcast editor. For example, when the broadcast editor decides to broadcast a synthetic image, he or she may have to instruct the CGI software to create synthetic images to replace a predetermined portion of the video footage.

In some embodiments, the CGI program(s) are constantly rendering 3 Dimensional images of a live event as portions of the event and/or sports plays unfold. When the broadcast editor wants to broadcast synthetic images of the live event instead of the live media footage, he or she may access the software on the broadcast computer to retrieve the desired images. In some embodiments, as the 3 Dimensional images are constantly rendered, the synthetic images may simply be treated as another live media feed (for example, the broadcast editor has access to camera 1, to camera 2, and to CGI images). In some embodiments, CGI programs are constantly receiving data from the recording equipment, and devices that may be of particular importance would be the devices that are collecting live telemetric data such as Radar devices, Laser devices, Sonar Devices, Motion Sensors, GPS transmitters, RFID devices, still and/or video cameras, accelerometers, and the like.

In some embodiments, a variety of static data may be stored in the broadcast computer's database to be accessed by CGI software on the broadcast computer and used to render a synthetic image of a live event. Several examples of static measurements that may be stored in a database include, but are not limited to: measurements of specific participants (for example, players, coaches, referees, umpires, and animals (such as horses and/or dogs involved in racing)); measurements that may include height, weight, waistline, wingspan, shoulder breadth, arm length, hand span, shoe size, leg length, size of torso, head circumference, and the like; measurements or boundaries of sports fields, courts, rinks, and the like; measurements of features for specific venues such as ballparks; measurements such as the distance between bases, the height and length of a foul pole at a baseball field, the height of an outfield wall, the distance from home plate to the outfield wall for a particular ballpark (for example, at multiple points of intersection along the arc of the outfield wall), the distance between end zones, and/or the height and length of a net on a tennis court. Thus, many of the static measurements depend upon the event or sport.

In addition, still photographs and/or video of the actual participants of the event (such as specific players, coaches, referees, umpires, animals (for example, for horse and/or dog racing)) and elements of specific sports fields or venues may be stored, so that a broadcasting computer can render images that closely resemble their real-life counterparts. Accordingly, the pictures or renderings of specific players that are stored enable the computer to accurately create a virtual 3D image of the player to insert into a synthetic image, whereas pictures or renderings of sports fields and stadiums may be stored to enable the computer to accurately create a virtual 3D image of the sports venue in a synthetic image. An example of a system for generating and displaying 3D models is the 3DReplay football analysis system from the Orad Company. Additional details of such a system can be found in U.S. Pat. No. 6,990,681 to Wang et al.

In some embodiments, CGI programs may be utilized to produce partial overlay graphics to be used in conjunction with actual footage. The partial overlay graphics may be time-synced with the actual broadcast video. For example, sensors attached to the uniform of a baseball catcher may be used to detect a collision with a base-runner at home plate. Based on the collision triggering event and the data collected by the sensors, a CGI program recognize a catcher's body position within the video footage and subsequently generate and/or render a skeletal overlay of the impact zones for both players. During the broadcast, the areas of collision may be overlaid with an x-ray vision-like graphic of the player's bones, giving the viewer an idea of the severity of the impact.

In some embodiments, synthetic images may also be used to show a play in slow motion or to give video footage "bullet time" effects. For example, if the broadcast footage is synthetic or computer generated, then the broadcast editor can control the speed of output to create synthetic slow motion footage, and/or the synthetic image may be programmed to pause, zoom in, and zoom out at any point during a play. In another implementation, during playback of synthetic images, the camera angle may be fluid rather than stationary. For example, the camera can be slowly pivoting around a base runner in a circle such that a 360 degree view of the play is shown over the course of the entire play, or the camera angle may be from the viewpoint of a baseball as it popped up by the batter, into the outfield, and caught by the outfielder (that is, the camera is traveling the same trajectory line as the ball's path). In another example, while a computer generated play is being shown, the images may be slowed down severely and/or paused while the camera (angle of view) swings around the player to show a different perspective or view of the play, and then the play may be resumed at normal speed from the new viewpoint.

2.2.3. Other Modifications

In some embodiments, additional footage may be added to an exciting play that normally would last only a few seconds, in order to provide additional or contextual content. Exemplary additional footage may provide extra context to a play's significance such as crowd reactions, other player/coach expressions, alternate viewing angles, and the like. In an embodiment, the additional material may be cut into the edited live media feed of the original play. For example, when a basketball player is making a shot at the buzzer (which signifies the end of a quarter, or the end of the game) and the ball is in mid air, the live media feed may be paused while a camera pans the crowd to show reactions or a close up of the opposing coach's facial expressions. Immediately thereafter, the live media feed of the game continues from where it was paused, to show the basketball continuing on its trajectory to the hoop. Thus, one or more modification effects may be applied to a portion of the presentation of a live event, wherein a selected modification effect may be based on an activity that is associated with the live event (in this example, a shot of the basketball at the buzzer of the basketball game). A modification of a portion of the live event feed may also be based on other considerations, such as the venue of the live event (in this example, the basketball arena including the crowd in attendance to view the basketball game), and/or based on the particular participants (in this example, a basketball point guard who took the last shot of the game).

In some embodiments, a split screen view of the action may be provided so that additional and innovative shots can be provided, all in the initial broadcast of the play. For example, after determining that an event or play is suitable for modification, identify one or more useful supplemental camera angles and broadcast them simultaneously with the main camera angle. For example, after a baseball batter hits the ball, the viewing screen may be split to show a fielder on the top half while showing the base runner(s) on the bottom half. In some embodiments, the broadcast media will automatically be split or segmented so that additional video clips, or still images may be presented. For example, a pop-up box similar to a picture-in-picture (PIP) box may be utilized to provide additional content on the viewer's screen. In such an embodiment, the user may be able to turn the box on and off or to change its size.

In some embodiments, supplemental content may include supplemental statistics, statistics that are dynamically configured based on events in the game (for example, an image may be shown that depicts a base runner's chances of successfully stealing a base based on the pitcher and/or on the catcher, or an image may be shown that is configured based on the speed of the pitch), based on other broadcasts (for example, other games, talk shows, sportscaster predictions, and the like), other events occurring concurrently, and/or replays of similar events. May other types of supplemental content are contemplated.

As discussed above in regards to computer generated imagery, in some embodiments the broadcast editor has a delay time between when the sports play occurs in real time and when that sports play is actually broadcast. The broadcast editor can thus use the delay time to ensure that best camera angles possible are used for the final broadcast version of the live media feed. For instance, the broadcast editor knows what location within the action on the field to highlight because he or she has already seen the play's outcome, therefore the broadcast editor can use the broadcast delay to either generate a synthetic image or to pick the best angle from the available feeds. For example, assume a running play during a football game is being shown from the sideline. When the running back is about to hit a hole opened by his offensive line, the broadcast editor can switch to an end zone camera or a camera positioned above the field, showing a view similar to what the running back sees. Then, once the running back is through the hole and moving down the field closer to the end zone, the camera angle can be switched back to the sidelines to get the best possible view of whether or not the ball actually crossed the goal line. In some embodiments, the camera angle may not change, however it may be beneficial to have a close up or zoomed-out view of the current angle. In the above example, the broadcast editor may enhance the final goal line footage of the running back to get a close up on the ball.

In some embodiments, the audio footage may be changed and/or modified. For example, the live audio may be slowed down to the same speed of the video that is broadcast, or sound effects can be added to supplement the visual effects (for example, sounds to mimic a lens zooming in, or a slow heartbeat during a slow motion sequence, and the like). Music can be added, as well as sound effects such as fake echoes or explosions during peak moments, such as a loud crack when a baseball batter hits a home run, or a "boom" noise when a soccer player kicks the ball hard so that it rockets towards the goalkeeper and scores a goal.

In some embodiments, in addition to changing the audio sounds associated with the action of the game, an alternate commentary may be provided to coincide with slower video footage. In particular, if commentary that coincides with an event that occurred in real time is presented, then the audio commentary and the video footage will be out of synch. An alternate or modified commentary may be presented instead. For example, the running commentary from a commentator watching the sports game in real time may be paused during the modified portion of the broadcast media and then resumed during a real time "replay" of the sports play, or commentary may be digitally modified or extended so that it coincides with the modified live events as the modified live events are broadcast. In some embodiments, a computer program may be used to synch the broadcast commentary with the broadcast video, and a variety of methods may be used. For example, pauses in between words and sentence length may be altered by a computer program to synchronize the words with moments throughout a broadcast event. Words or phrases spoken during a particular moment in a real-time portrayal of an event may be output at a coinciding moment in a slow motion version of the event. In an example, the real-time commentary may be slowed by the same amount as the slowed video feed. For example, a database of comments may be used to provide "filler" commentary, in a manner similar to the way that video games create commentary during the game action. In another example, an entirely separate audio commentary may be generated by a group of commentators who watch the modified live media video feed (which will be used in the modified live media broadcast) rather than the events as they happen in real time. In one example, separate commentary may be created by additional commentators watching the modified live media as it is being broadcast, or the audio commentary may be created as the broadcast editor edits an editing version of the live media footage and then mixes to the video portion to the audio commentary using a mixing board. In embodiments where the commentators are shown the modified event that is broadcast instead of watching the live events as they occur in real time, an additional broadcast delay may be required in order to monitor the commentators for the use of profane or other inappropriate language.

In some embodiments, visual effects could be added to the output images to create altered or modified images to emphasize emotional reactions. For example, the background of the live media footage may be darkened and the playmaker may be highlighted or otherwise illuminated in order to provide contrast and to highlight the featured play. In a particular example, the contrast of a broadcast image can be increased to emphasize a successful play, or darkened or decreased to emphasize an unsuccessful play. This may be especially useful for hometown broadcasts. For example, for a professional football game between the Seattle Seahawks and the Arizona Cardinals, a local broadcast in Arizona may darken the screen or other elements of the video during a Seahawks touchdown, whereas the local broadcast for the Seattle area may include a brightened screen during the same play. In another example, the image broadcast may appear to shake slightly during a particularly hard hit in a football game, or the broadcast image may flash brightly when a tennis player serves an ace.

In some embodiments, digital overlays may be added to enhance the viewer's understanding of an event and/or game, or added during a particular situation occurring at a particular point within the event and/or game. For example, the broadcast image screen may be marked up by editors or commentators to be included in the initial broadcast to includes such information as the names of featured players and/or elements that could appear above or below the players or elements, or the particular players or elements could be circled, haloed, or otherwise highlighted, and certain other markings could be added to indicate such information as a player's probable choice for a particular play, such as a favored direction that a kick returner might follow up the football field during a kickoff. In such embodiments, screen markings above, below or on the broadcast images can indicate things that normally go unnoticed, such as a block made by a player in a football game during a play that allowed the running back to score a touchdown. Such markings may consist of arrows, lines, circles and other shapes, haloes, highlights, stat boxes, names and other text. In some embodiments, an important or dominant player may be highlighted in the modified video. For example, a football receiver to whom a pass is going to be thrown may be highlighted from the start of the play. Note that the importance of a particular player on the field during a game may be determined based on the result of the play, which is possible because the broadcast editor can advantageously use the delay in the broadcast to watch the outcome of the play in real time before highlighting any one player or group of players. Similarly, important objects or locations may be highlighted, such as a wrench that is left on the track during a pit-stop or left in the maintenance pit during a NASCAR race at a racetrack. The position of the wrench may be important later on in the broadcast, for example, if one of the racing cars runs over it and the wrench causes a flat tire.

2.3 Resuming a Live Broadcast

Due to the insertion of one or more modifications into the broadcast of the live event, the broadcast delay may be difficult to keep constant during a broadcast. For example, if several slow motion footage clips of portions of a live event are broadcast along with all of the other action, then the delay between the actual event (the live event) and the broadcast of the event may get longer and longer. Therefore, since many embodiments extend and/or slow down a live media feed (which may include both video footage and/or audio footage), broadcast editors may have trouble keeping the broadcast delay constant.

FIGS. 6A, 6B and 6C depict three timelines labeled 600, 620 and 630, respectively, to illustrate how a broadcast delay introduced into a conventional broadcast timeline, plus delays introduced by modifications to some of the portions of the live media feed that occur during the broadcast, may extend the modified live media feed to result in a longer broadcast delay for the modified live media feed broadcast. In particular, FIG. 6A shows a Timeline 600 of the actual events as they occur in real time, and the total sample amount of this example is thirty-nine (39) seconds. FIG. 6B shows a conventional live media feed broadcast timeline 620 of the actual events that includes a seven (7) second delay to result in a total time of forty-six (46) seconds 627. FIG. 6C shows the Timeline 630 of a modified live media feed broadcast which uses the processes discussed above, wherein several portions of the live media feed have been modified. With regard to the conventional broadcast timeline 620 of FIG. 6B, it should be noted that the length of each event that is broadcast (Event 1 to Event 5) is the same as the amount of time each event took to occur in real time, except that a seven (7) second delay 621 has been introduced, which is reflected in the conventional broadcast timeline 620. But in FIG. 6C, which is a broadcast of the modified live media feed of the live event (Timeline 630), in addition to the seven second delay 631, included are Modified Event 3 (636) and Modified Event 5 (639) that are longer in duration than the length of time of the corresponding Event 3 (626) and Event 5 (628) of FIG. 6B. In this example, the overall modified live media feed broadcast shown in the timeline 630 is longer (because the modified live media feed included slow motion effects) than that of the Conventional Broadcast Timeline 620, and thus the modified live media feed broadcast depicted by Timeline 630 begins with a 7-second delay 631 and ends with a 24-second total delay 637, which will be explained in detail immediately below.

Referring to FIG. 6A, in Timeline 600, "Event 1" 602 lasts five (5) seconds, "Event 2" 604 lasts seven (7) seconds, "Event 3" 606 lasts seven (7) seconds, "Event 4" 608 lasts ten (10) seconds and "Event 5" 609 lasts ten (10) seconds for a total 607 of thirty-nine (39) seconds of footage. The conventional broadcast timeline 620 includes the same "Event 1" through "Event 5" (designated by reference numbers 622, 624, 626, 628 and 629), but each of these events are delayed by seven (7) seconds for a total 627 of forty-six (46) seconds (equal to 39 seconds plus the 7 second delay). However, as explained above, in the modified live media feed broadcast timeline 630 of FIG. 6C, in addition to the seven second delay, the footage of "Event 3" 636 has been modified and is now fourteen (14) seconds in length, and the footage of "Event 5" 639 has been modified and is now twenty (20) seconds in length, which results in a total duration 637 of sixty-three (63) seconds (which includes a total delay of twenty-four (24) seconds). Thus, as the live media feed is modified throughout a broadcast of the event, the broadcast images are moved further and further away from the events as they are occurring in real time (as shown in FIG. 6A). In some embodiments, networks and/or broadcasters may have to make scheduling adjustments to account for such longer broadcasts. However, in some embodiments, broadcasters may use one or more of the following methods to maintain a relatively constant delay between the occurrence of the live event and the broadcast.

It is recognized that many conventional broadcasts show replays during uneventful periods after an exciting play has occurred. Since the current process proposes showing live events in slow motion the first time the events are broadcast, then such conventional replay methods—especially those employing slow motion replays—may be unnecessary. Therefore, if a modified clip extends into the "down time" between particular events or sports plays (wherein no interesting action occurs), networks may simply cut out replays, or even show replays in real time (since a slow motion clip has already been provided in most embodiments). Such a process would prevent the delay between the live media feed broadcast and a live event from continually increasing throughout the broadcast, potentially resulting in a broadcast of a live event that occurs much after the events happen in real time (and also to prevent the broadcast to become undesirably long).

The term "down time" (or "downtime") may be understood to mean a portion of an event wherein no action of interest occurs. For example, down time occurs in a tennis match when players switch sides on the tennis court, occurs in a baseball game after the third out ends a half-inning and the visiting team runs into the dugout while the home team trots onto the field, and occurs when a team calls for time-out to stop the action in a sports game. Thus, some of the downtime that has conventionally been aired by a network, such as a live media feed of footage that occurs after a pitch is pitched, or the live media feed that includes footage of a football team breaking a huddle and going to the line of scrimmage after a play, or when tennis players change racquets or switch sides during a match, could be omitted to reduce any added delay time due to the broadcast of a modified live media event. Thus, whenever a delay is extended due to the addition of a modified live media feed, the editors may be able to simply edit out such "down time" or non-action sequences (or portions thereof) to return to the preset traditional or conventional delay period.

FIG. 7A depicts an Actual Events Timeline 700, FIG. 7B shows a Conventional Broadcast Timeline 720, and FIG. 7C illustrates a Modified Live Media Broadcast Timeline 730. Referring to FIG. 7A, the Timeline 700 illustrates an "Event 1" 702 of five (5) seconds, an "Event 2" 704 of seven (7) seconds, and an "Event 3" 706 that represents an exciting play lasting seven (7) seconds, followed by "Down Time" 708 lasting about ten (10) seconds. Referring to FIG. 7B, the Conventional Broadcast Timeline 720 includes a broadcast delay 721 of seven (7) seconds, and also includes "Event 1" through "Event 3" and the "Down Time" (reference numbers 722, 724, 726 and 728) that are exactly the same duration as their corresponding counterparts shown in the Timeline 700 of FIG. 7A. In this example, "Event 3" 706 is identified by a broadcast editor who is monitoring the live event as a portion of the live event that is suitable for application of a modification. Thus, "Event 3" of the live media feed is modified, for example, by applying a selected slow motion effect to the footage of the live media feed which results in the "Modified Event 3" 736 that is fourteen (14) seconds in duration. Thus, FIG. 7C depicts a modified live media feed broadcast timeline 730, which includes the same broadcast delay 731 of seven (7) seconds, an "Event 1" 732 having a five (5) second duration, an "Event 2" 734 of seven (7) seconds, and a "Modified Event 3" 736 that represents the exciting sports play which has been modified to be fourteen (14) seconds in duration. However, the "Modified Event 3" is seven (7) seconds longer in duration than the original "Event 3" 726, and thus has an associated modified event delay of seven (7) seconds (the modified event total duration of fourteen seconds minus the original length of the unmodified event of seven seconds equals the modified event delay of seven seconds).

Also shown in FIG. 7C is a reduced "Down Time" 738, which has been cut back to last only three (3) seconds (from the original length of ten (10) seconds as shown in FIG. 7B, see "Down Time" 728). Thus, in this example, seven seconds of the "Down Time" 738 has been omitted from the modified live media feed broadcast to compensate for the modified event delay time of seven seconds that was added by "Modified Event 3" 736. The result is that the end time 729 shown in FIG. 7B is exactly the same as the end time 739 of the modified live media feed broadcast timeline 730 of FIG. 7C. This result occurs because the extra time it took to broadcast the modified exciting sports play ("Modified Event 3" shown in FIG. 7C) has been taken out of (or subtracted from) the "Down Time" 728 of ten seconds, so that the resulting "Down Time" 738 is now only three (3) seconds in duration (instead of ten seconds). Accordingly, in the conventional broadcast timeline 720 of FIG. 7B, such down time could be used to show replays or provide extra commentary, but the present process as shown in FIG. 7C utilizes such down time to compensate for any modified live media footage that is broadcast (such as "Modified Event 3", which in this example causes seven (7) seconds of the downtime to be omitted) to result in the same seven (7) second delay 739 for the modified live media feed broadcast as the delay 729 associated with the conventional broadcast.

The example of FIGS. 7A-7C is simplified for ease of understanding, but one skilled in the art would understood that multiple downtime portions may exist during the broadcast of a live event, and that larger or smaller portions of such multiple down time events may be used to compensate for any modified live media event delays that have been accumulated and then added to the overall broadcast delay of the modified live media feed broadcast. For example, if a particularly spectacular catch is made at a crucial point in a football game, then that event may be subjected to several modifications as it is being broadcast that results in a modified event delay of, for example, thirty (30) seconds. In such a case of an unusually long modified event delay, a portion of multiple down time events that conventionally occur during the remainder of the football game may be omitted to compensate for the thirty second modified event delay. For example, ten seconds of down time from a first down time portion, plus three seconds of down time from a second down time portion, plus twelve seconds of down time from a third down time portion, and so on, could be used to eventually totally compensate for the unusually long modified live media event delay duration of this example to thus reestablish the predetermined broadcast delay. Thus, the broadcast delay may fluctuate during a modified live media feed broadcast of the live event based on the nature and duration of any modified event delays that may have been added and/or accumulated, and based on the number and duration of down time events that have been omitted from the broadcast.

In some embodiments, replays may remain, and other methods may be used to maintain a constant delay period between the actual event and the broadcast. For example, in circumstances such as a controversial play, where the play may be shown multiple times, the broadcast may have time to show at least one replay as well as the modified live media feed broadcast of that event. In some embodiments replays may be shown in real time speed (because replays are usually the slow motion version of the real time play, real time replays are just the reverse of this process), and in other embodiments one or more of some plays will be shown multiple times because such plays have a "you gotta see this" quality (this quality is akin to viewers being so excited about a play that they call others into the room to see a replay). Therefore, time may be scripted into a broadcast in order to allow for multiple replays of such really impressive plays (for example, it may be forecast that at least four plays during a particular the "Superbowl" football game will merit such treatment). In some embodiments, networks may run fewer commercials to clear time to make up for the time used to provide the modified events during the broadcast. For example, each time a broadcast is extended by sixty (60) seconds over a predetermined limit one or more commercials may be cut out from the broadcast.

Figure 7D:
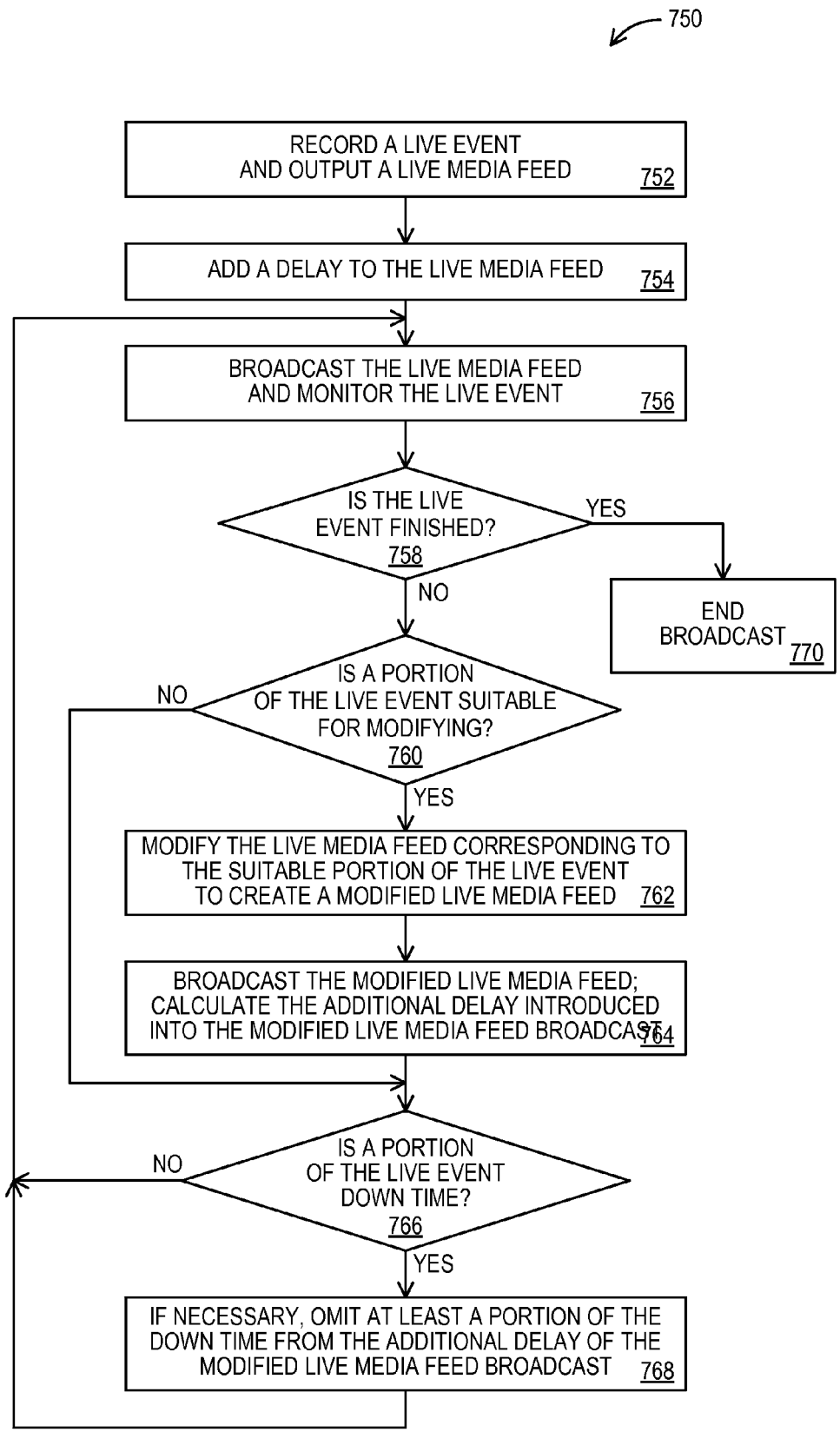
FIG. 7D is a simplified flowchart of an embodiment of a process for broadcasting modified live media feeds and for correcting the additional delays that may be introduced.

FIG. 7D is a simplified flowchart of an embodiment of a process 750 for broadcasting a modified live media feed and for correcting any additional delays that may be introduced. As described above, a live event is recorded 752 using one or more recording devices, and then a delay is added 754 to the live media feed. The live media feed is then broadcast 756 with the delay, and a broadcast editor monitors the live event. If the live event is not finished 758, and it is determined that a portion of the live event is suitable for modification 760, then the live media feed corresponding to that suitable portion of the live event is modified 762 to create a modified live media feed. The modified live media feed is then broadcast 764 and a calculation is made to determine the additional delay, if any, that has been introduced into the modified live media feed broadcast. Next, if a determination is made that a portion of the live event is down time 766, then at least a portion of the downtime is omitted 768, if necessary, from the modified live media feed broadcast (to compensate for at least a portion of any additional delay that has been introduced due to one or more modified events). The process then branches back to step 756 wherein the broadcast of the recorded live media feed is continued and is also monitored by the broadcast editor. If the live event is finished 758, then the broadcast ends 770.

However, if in step 760 it is determined that a portion of the live event is not suitable for modification, then the process branches to step 766 to check if the portion of the live event is down time. If the portion is down time, then if necessary (for example, the broadcast delay time has been increased due to prior modifications of the live event that have already been broadcast and not yet corrected for) at least a portion of the downtime is omitted from the modified live media feed broadcast. The process then branches back to step 756 to continue the broadcast of the live event.

If in step 766 it is determined that a portion of the live event is not down time, then the process branches back to step 756 wherein the broadcast of the live event (with any delays including the initial or conventional broadcast delay) continues. This process continues until the live event is finished in step 758, resulting in the end of the broadcast 770.

In the embodiment of FIG. 7D, the amount of down time that occurs during the event is utilized to adjust any modification delays that are introduced into the modified live event feed broadcast when modifications are made to events that are identified as worthy of such modification. In some implementations, down time may be adequate to compensate for all modifications made during the broadcast of a live media feed. For example, during tennis matches there are natural breaks wherein certain actions occur that need not be broadcast, such as a tennis player wiping down the handle of his racket after a rally during the match, officials conferring over a call on a shot, the players on both sides of the net switching sides, and when the players take breaks between games and/or sets of games. Such down time occurrences are common to the game of tennis, and thus a certain amount of time could be planned or forecast as down time for every match so that a fairly accurate estimate can be made of the number of events that could be modified for any particular broadcast of such a live event. Of course, due to the nature of some sporting events and/or action events, accurate estimates of down time may not be possible, which makes any attempt to pre-plan the number of modified events difficult.

The application of broadcast modification effects may result in an event broadcast having a variable delay. For example, the broadcast of a sporting event may start out with a seven (7) second delay, which may gradually increase to a twenty (20) second delay during a slow motion broadcast modification effect, and then jump down to a ten (10) second delay after a ten (10) second downtime portion is omitted from the broadcast (for example, when the ball goes out of bounds during a basketball game). In order to assist broadcast editors, commentators and other broadcast personnel, the amount of delay in the broadcast pipeline or in a portion of the broadcast pipeline may be displayed. For example, because of broadcast modification effects, a broadcast is currently running on a twenty (20) second delay. In such a case, a digital clock in the production truck may display "20 seconds" to indicate the amount of delay currently in the broadcast to the broadcast director. Audio from commentators (such as from the play-by-play announcer) may be inserted on a thirteen (13) second delay (to thereby allow for an additional seven (7) seconds to edit out any vulgar or offensive language). In addition, to help the commentators synchronize their comments, a clock in the broadcast booth may display the amount of time that the comments are delayed relative to the live event (thirteen (13) seconds).

Traditionally, important sports plays are broadcast and shown in real time speed, and then shown two or three more times in replays (often in slow motion). Even if the viewer misses the initial broadcast of a big play, there is a good chance that he or she is going to see the play in one of the replays. However, in some embodiments, the present processes contemplate replacing replays with one long, slow motion piece of footage. Thus, if the viewer misses the play the first time, there is a smaller chance that he or she will see the replay (at least not a slow motion version). Therefore, since the broadcast editor sees the important or big play before it is broadcast, in some embodiments a "big play alert" warning can be provided in advance for the viewer. For example, the broadcast image during the live event broadcast may cause the screen to flash several times brightly before a big play is about to occur, and/or the broadcast action on the screen may pause and display a message such as "check out this play!" before a big play is about to occur, and/or an audible signal may be played (for example, a beeping sound, a siren, a catch phrase, and the like) to alert the viewer that a big play is about to be broadcast for his or her viewing pleasure. In some embodiments, a tactile signal may be sent to the viewer's seat, or handheld remote control, and the like, such as a vibration or rumble effect to get the viewer's attention and to alert the viewer to pay attention to the screen for the upcoming play.

Although the present methods and systems have been described with respect to preferred embodiments thereof, those skilled in the art will note that various substitutions and modifications may be made to those described embodiments without departing from the spirit and scope of the present invention.

What is claimed is:

1. A method, comprising:
   receiving, at a broadcast computer, a live media feed of real time occurrences of a live event;
   broadcasting the live media feed after a predetermined delay;
   identifying, during monitoring of the live event, a portion of the live event that is suitable for application of a modification effect;
   applying, by the broadcast computer, the modification effect to a portion of the live media feed that corresponds to the identified portion of the live event;
   determining, by the broadcast computer, a modified event delay associated with the modified portion of the live event;
   identifying, by the broadcast computer during monitoring of the live event, a portion of the live event as down time;
   omit at least a portion of the down time from the modified live media feed to compensate for at least a portion of the modified event delay; and
   broadcasting the modified live media feed.

2. A system, comprising:
   at least one recording device; and
   a broadcast computer configured to receive data from the at least one recording device, the broadcast computer comprising a processor and a storage device, wherein the storage device includes instructions configured to direct the processor to:
   receive a live media feed of real time occurrences of a live event;
   broadcast the live media feed after a predetermined delay;
   identify, during monitoring of the live event, a portion of the live event that is suitable for application of a modification effect;
   apply the modification effect to a portion of the live media feed that corresponds to the identified portion of the live event;
   determine a modified event delay associated with the modified portion of the live event;

identify, during monitoring of the live event, a portion of the live event as down time;

omit at least a portion of the down time from the modified live media feed to compensate for at least a portion of the modified event delay; and broadcast the modified live media feed.

3. The system of claim 2, wherein the storage device further comprises instructions configured to direct the processor to omit additional down time portions from the modified live media feed to reestablish the predetermined delay.

4. The system of claim 2, wherein the storage device further comprises instructions configured to direct the processor to resume the broadcast of the live media feed.

5. The system of claim 4, in which the instructions for resuming the broadcast of the live media feed comprises instructions configured to direct the processor to broadcast at least one replay of a selected portion of the live event at a normal playback speed.

6. The system of claim 2, in which the instructions for identifying the portion of the live event suitable for modification comprises instructions configured to direct the processor to insert a first identifier to mark the start of the portion of the live event suitable for modification, and to insert a second identifier to mark the end of the portion of the live event suitable for modification.

7. The system of claim 6, in which the instructions for applying the modification to the portion of the live event comprises instructions configured to direct the processor to apply at least one special effect between the first identifier and the second identifier.

8. The system of claim 7, in which the instructions for applying the at least one special effect comprise instructions configured to direct the processor to apply at least one of a slow motion effect, a synthetic image, or multiple sub-event images.

9. The system of claim 7, in which the instructions for applying the at least one special effect comprise instructions configured to direct the processor to apply at least one of a computer generated image, a three-dimensional image, an image based on static data, an overlay graphic, additional footage, a split screen effect, supplemental content, or an alternate camera angle image.

10. The system of claim 2, in which the storage device further comprises instructions configured to direct the processor to, prior to applying the modification effect to the portion of the live event, select at least one of a plurality of effects to apply to the portion of the live event based on an activity associated with the live event.

11. The system of claim 2, in which the instructions for applying the modification effect to the portion of the live event comprise instructions configured to direct the processor to provide an alternate audio feed.

12. The system of claim 2, in which the instructions for applying the modification effect to the portion of the live event comprise instructions configured to direct the processor to apply at least one of a slow motion effect, a synthetic image, or footage provided by a slow motion camera.

13. A non-transitory computer readable medium which stores instructions that are configured to direct a processor to:

receive a live media feed of real time occurrences of a live event;

broadcast the live media feed after a predetermined delay;

identify, during monitoring of the live event, a portion of the live event that is suitable for application of a modification effect;

apply the modification effect to a portion of the live media feed that corresponds to the identified portion of the live event;

determine a modified event delay associated with the modified portion of the live event;

identify, during monitoring of the live event, a portion of the live event as down time;

omit at least a portion of the down time from the modified live media feed to compensate for at least a portion of the modified event delay; and broadcast the modified live media feed.

14. The computer readable medium of claim 13, further comprising instructions configured to direct the processor to omit additional down time portions from the modified live media feed to reestablish the predetermined delay.

15. The computer readable medium of claim 13, further comprising instructions configured to direct the processor to resume the broadcast of the live media feed.

16. The computer readable medium of claim 15, in which the instructions for resuming the broadcast of the live media feed comprises instructions configured to direct the processor to broadcast at least one replay of a selected portion of the live event at a normal playback speed.

17. The computer readable medium of claim 13, in which the instructions for identifying the portion of the live event suitable for modification comprises instructions configured to direct the processor to insert a first identifier to mark the start of the portion of the live event suitable for modification, and to insert a second identifier to mark the end of the portion of the live event suitable for modification.

18. The computer readable medium of claim 17, in which the instructions for applying the modification effect to the portion of the live event comprises instructions configured to direct the processor to apply at least one special effect between the first identifier and the second identifier.

19. The computer readable medium of claim 17, in which the instructions for applying the at least one special effect comprise instructions configured to direct the processor to apply at least one of a slow motion effect, a synthetic image, or multiple sub-event images.

20. The computer readable medium of claim 17, in which the instructions for applying the at least one special effect comprise instructions configured to direct the processor to apply at least one of a computer generated image, a three-dimensional image, an image based on static data, an overlay graphic, additional footage, a split screen effect, supplemental content, or an alternate camera angle image.

21. The computer readable medium of claim 13, further comprising instructions configured to direct the processor to, prior to applying the modification effect to the portion of the live event, select at least one of a plurality of effects to apply to the portion of the live event based on an activity associated with the live event.

22. The computer readable medium of claim 13, in which the instructions for applying the modification effect to the portion of the live event comprise instructions configured to direct the processor to provide an alternate audio feed.

23. The computer readable medium of claim 13 in which the instructions for applying the modification effect to the portion of the live event comprise instructions configured to direct the processor to apply at least one of a slow motion effect, a synthetic image, or footage provided by a slow motion camera.

* * * * *